US008953707B2

(12) United States Patent
Ro et al.

(10) Patent No.: US 8,953,707 B2
(45) Date of Patent: Feb. 10, 2015

(54) DIFFERENTIAL CODEBOOK FOR TEMPORALLY-CORRELATED MISO DUAL-POLARIZATION ANTENNA

(71) Applicants: Samsung Electronics Co., Ltd., Gyeonggi-do (KR); Purdue Research Foundation, West Lafayette, IN (US)

(72) Inventors: Sangmin Ro, Seoul (KR); Junil Choi, West Lafayette, IN (US); David J. Love, West Lafayette, IN (US); Juho Lee, Gyeonggi-do (KR)

(73) Assignees: Samsung Electronics Co., Ltd (KR); Purdue Research Foundation, West Lafayette, IN (US)

( * ) Notice: Subject to any disclaimer, the term of this patent is extended or adjusted under 35 U.S.C. 154(b) by 67 days.

(21) Appl. No.: 13/656,075

(22) Filed: Oct. 19, 2012

(65) Prior Publication Data

US 2014/0112413 A1    Apr. 24, 2014

(51) Int. Cl.
*H04K 1/02*        (2006.01)
*H04B 7/04*        (2006.01)
*H04B 7/06*        (2006.01)

(52) U.S. Cl.
CPC .......... *H04B 7/0469* (2013.01); *H04B 7/0456* (2013.01); *H04B 7/0482* (2013.01); *H04B 7/0639* (2013.01)
USPC ........................................................ 375/296

(58) Field of Classification Search
CPC .................................................... H04B 7/0456
USPC ........................................................ 375/296
See application file for complete search history.

(56) References Cited

U.S. PATENT DOCUMENTS

| | | | |
|---|---|---|---|
| 2008/0253478 A1* | 10/2008 | Kim et al. | 375/299 |
| 2010/0208716 A1* | 8/2010 | Mujtaba et al. | 370/342 |
| 2011/0002263 A1* | 1/2011 | Zhu et al. | 370/328 |
| 2011/0080964 A1* | 4/2011 | Shamsi et al. | 375/260 |
| 2011/0170621 A1* | 7/2011 | Choi et al. | 375/260 |

* cited by examiner

*Primary Examiner* — Santiago Garcia
(74) *Attorney, Agent, or Firm* — The Farrell Law Firm, P.C.

(57) ABSTRACT

A code word selection method performed by a User Equipment (UE) in a wireless communication system is provided. The method includes generating a rotation matrix using previously selected codeword; generating a new differential code book using the rotation matrix and a differential code book; selecting a code word from the new differential code book; and performing data transmission using the selected code word.

11 Claims, 9 Drawing Sheets

FIG. 2
(PRIOR ART)
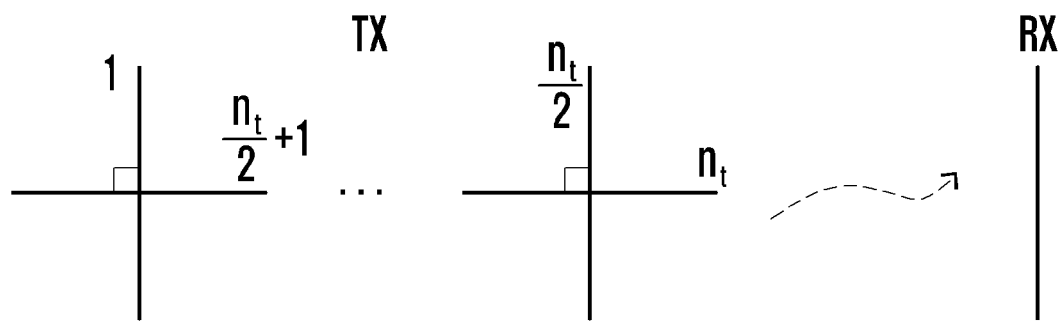
(a) Dual-polarized MISO scenario
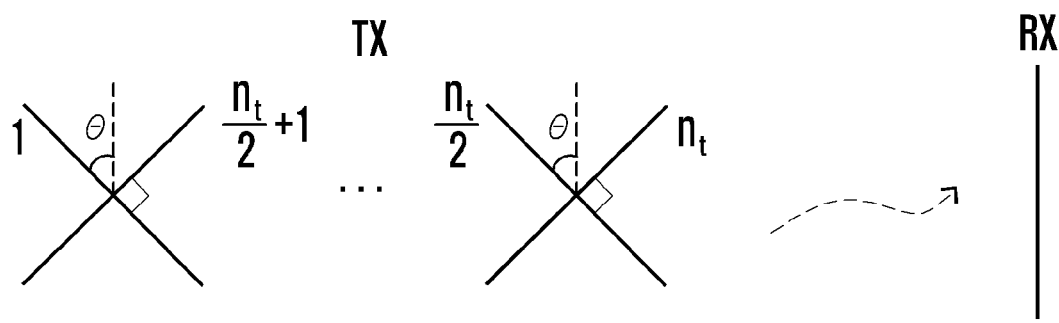
(a) Rotated dual-polarized MISO scenario

DIFFERENTIAL CODEBOOK FOR TEMPORALLY-CORRELATED MISO DUAL-POLARIZATION ANTENNA

BACKGROUND OF THE INVENTION

1. Field of the Invention

The present invention relates generally to code word selection and, in particular, to a code word selection method in a wireless communication system.

2. Description of the Related Art

In order to facilitate the spatial multiplexing of wireless Multiple-Input-Multiple-Output (MIMO) systems is essential for a transmitter to have Channel-State Information (CSI) corresponding to the transmitter and a receiver. Limited feedback schemes using codebooks are commonly used by receivers as methods for sending CSI to transmitters in Frequency-Division-Duplex (FDD) systems.

There are various codebook schemes that attempt to efficiently represent CSI under certain assumed channel characteristics. For example, Grassmannian-Line-Packing (GLP) codebooks, Discrete-Fourier-transformation (DFT) codebooks, and block-diagonalization codebooks are suitable for Independent, Identically Distributed (i.i.d) Rayleigh channels, spatially correlated channels, and dual-polarized channels respectively.

All of the above-described codebooks are fixed codebooks (i.e., codebooks that are not changed or updated with changes in time or frequency). In the Institute of Electrical and Electronics Engineers (IEEE) 802.16m specification, however, includes two kinds of codebook adaptation methods. A transformation (Adaptive) codebook corresponds to an adaptation method for spatially correlated channels and a differential codebook is used for temporally correlated channels.

Among various kinds of differential codebooks, a polar-cap differential codebook has been adopted in the IEEE 802.16m specification.

FIG. 1 is a diagram illustrating operations of a polar-cap differential codebook.

Referring to FIG. 1, a polar-cap differential codebook is rotated to a previously selected codeword, and a new codebook is formed for a next time instant. If there is a strong temporal correlation in a channel, the channel at time $i$ may be close to the channel at time $\tau-1$. The polar-cap differential codebook tries to utilize this temporal correlation of the channel. There is a pre-defined polar-cap differential codebook $\tilde{W}^\tau = \{\tilde{w}_1^\tau, \ldots, \tilde{w}_{2^B}^\tau\}$ for each time $\tau$ (or the differential codebook can be fixed for all $\tau$ for simplicity) and all the codewords in the polar-cap codebook are rotated by a rotation matrix, which is a function of the previously selected codeword (or pre-coding matrix) and the basis of $\tilde{W}^\tau$. By updating codewords (or pre-coding matrices) for pre-coding, the same number of codewords (or pre-coding matrices) can be assigned to a smaller region, which results in less channel quantization error while maintaining the same feedback overhead.

For the future wireless communication systems such as $3^{rd}$ Generation Partnership Project (3GPP) Long Term Evolution (LTE) or LTE-Advanced systems, Dual-Polarized (DP) antennas, especially Rotated-Dual-Polarized (RDP) antennas, rather than Uniform-Linear-Array (ULA) antennas, have been considered for baseline scenarios.

FIG. 2 is a diagram illustrating Multiple Input Single Output (MISO) antenna scenarios.

Referring to FIG. 2, FIG. 2(a) shows a DP MISO antenna scenario, while FIG. 2(b) shows an RDP MISO antenna scenario. In the DP MISO scenario, there is power imbalance between the horizontal transmit antenna and the vertical receive antenna, such that the channel vector $h_{DP}$ can be defined according to Equation 1 as follows:

$$h_{DP} = [h_1\ h_2\ \sqrt{X_{DP}}h_3\ \sqrt{X_{DP}}h_4] \tag{1}$$

Equation 1 is applied to a four-transmission (4Tx) antenna case where $h_i$ is an i.i.d. complex Gaussian random variable with zero mean and unit variance representing channel gain from an i-th transmit antenna to a receive antenna, and $X_{DP}$ is the inverse of an XPD value representing cross-polar discrimination in a DP scenario. The parameter $0 \le \chi \le 1$ where $1 \le XPD \le \infty$. The XPD refers to the physical ability of the antennas to distinguish the orthogonal polarization. In the RDP MISO scenario, however, the impact of XPD for power imbalance is not severe as DP case because XPD impacts all channel elements in the RDP MISO scenario. In the RDP MISO scenario, the channel vector can be defined according to Equation 2 as follows:

$$h_{RDP} = [\sqrt{X_{RDP}}h_1\ \sqrt{X_{RDP}}h_2\ \sqrt{X_{RDP}}h_3\ \sqrt{X_{RDP}}h_4]. \tag{2}$$

Even in the DP MISO or MIMO scenarios, the impact of XPD decreases if multipath fading occurs. In such an environment, codewords (or pre-coding matrices) that have Rotated-Block-Diagonal (RBD) structures are beneficial. A $4 \times 1$ vector $w_k$ has an RBD structure, when $w_k$ is defined according to Equation 3 as follows:

$$G^{-1} w_k = \begin{bmatrix} a \\ b \\ 0 \\ 0 \end{bmatrix} \tag{3}$$

or $$\begin{bmatrix} 0 \\ 0 \\ a \\ b \end{bmatrix}$$

In Equation 3, G is a Givens rotation matrix, and a and b are complex numbers. With respect to a 45° tilted 4Tx antenna, G is expressed according to Equation 4 as follows:

$$G = \begin{bmatrix} \cos(45°) & 0 & -\sin(45°) & 0 \\ 0 & \cos(45°) & 0 & -\sin(45°) \\ \sin(45°) & 0 & \cos(45°) & 0 \\ 0 & \sin(45°) & 0 & \cos(45°) \end{bmatrix} \tag{4}$$

$$= \begin{bmatrix} \frac{1}{\sqrt{2}} & 0 & -\frac{1}{\sqrt{2}} & 0 \\ 0 & \frac{1}{\sqrt{2}} & 0 & -\frac{1}{\sqrt{2}} \\ \frac{1}{\sqrt{2}} & 0 & \frac{1}{\sqrt{2}} & 0 \\ 0 & \frac{1}{\sqrt{2}} & 0 & \frac{1}{\sqrt{2}} \end{bmatrix}.$$

As shown in Table 1, below, there are sixteen codewords (or pre-coding matrices) in LTE rank one codebook, and eight codewords (or pre-coding matrices) in the LTE rank one codebook have an RBD structure. As shown in Table 1, codewords (or pre-coding matrices) k=1, 2, 3, 4, 9, 10, 11 and 12 have an RBD structure.

TABLE 1

LTE rank 1 codewords and their rotated elements

| Codebook index k | LTE rank 1 codebook $w_k$ | $G^{-1}w_k$ |
|---|---|---|
| 1 | $\frac{1}{2}[1\ \ 1\ \ 1\ \ 1]^T$ | $\frac{1}{\sqrt{2}}[1\ \ 1\ \ 0\ \ 0]^T$ |
| 2 | $\frac{1}{2}[1\ \ j\ \ -1\ \ -j]^T$ | $\frac{1}{\sqrt{2}}[0\ \ 0\ \ -1\ \ -j]^T$ |
| 3 | $\frac{1}{2}[1\ \ -1\ \ 1\ \ -1]^T$ | $\frac{1}{\sqrt{2}}[1\ \ -1\ \ 0\ \ 0]^T$ |
| 4 | $\frac{1}{2}[1\ \ -j\ \ -1\ \ j]^T$ | $\frac{1}{\sqrt{2}}[0\ \ 0\ \ -1\ \ j]^T$ |
| 5 | $\frac{1}{2}\left[1\ \ \frac{1+j}{\sqrt{2}}\ \ j\ \ \frac{-1+j}{\sqrt{2}}\right]^T$ | $\frac{1}{\sqrt{2}}\left[\frac{1+j}{2}\ \ \frac{j}{\sqrt{2}}\ \ \frac{-1+j}{2}\ \ \frac{-1}{\sqrt{2}}\right]^T$ |
| 6 | $\frac{1}{2}\left[1\ \ \frac{-1+j}{\sqrt{2}}\ \ -j\ \ \frac{1+j}{\sqrt{2}}\right]^T$ | $\frac{1}{\sqrt{2}}\left[\frac{1-j}{2}\ \ \frac{j}{\sqrt{2}}\ \ \frac{-1-j}{2}\ \ \frac{1}{\sqrt{2}}\right]^T$ |
| 7 | $\frac{1}{2}\left[1\ \ \frac{-1-j}{\sqrt{2}}\ \ j\ \ \frac{1-j}{\sqrt{2}}\right]^T$ | $\frac{1}{\sqrt{2}}\left[\frac{1+j}{2}\ \ \frac{-j}{\sqrt{2}}\ \ \frac{-1+j}{2}\ \ \frac{1}{\sqrt{2}}\right]^T$ |
| 8 | $\frac{1}{2}\left[1\ \ \frac{1-j}{\sqrt{2}}\ \ -j\ \ \frac{-1-j}{\sqrt{2}}\right]^T$ | $\frac{1}{\sqrt{2}}\left[\frac{1-j}{2}\ \ \frac{-j}{\sqrt{2}}\ \ \frac{-1-j}{2}\ \ \frac{-1}{\sqrt{2}}\right]^T$ |
| 9 | $\frac{1}{2}[1\ \ 1\ \ -1\ \ -1]^T$ | $\frac{1}{\sqrt{2}}[0\ \ 0\ \ -1\ \ -1]^T$ |
| 10 | $\frac{1}{2}[1\ \ j\ \ 1\ \ j]^T$ | $\frac{1}{\sqrt{2}}[1\ \ j\ \ 0\ \ 0]^T$ |
| 11 | $\frac{1}{2}[1\ \ -1\ \ -1\ \ 1]^T$ | $\frac{1}{\sqrt{2}}[0\ \ 0\ \ -1\ \ 1]^T$ |
| 12 | $\frac{1}{2}[1\ \ -j\ \ 1\ \ -j]^T$ | $\frac{1}{\sqrt{2}}[1\ \ -j\ \ 0\ \ 0]^T$ |
| 13 | $\frac{1}{2}[1\ \ 1\ \ 1\ \ -1]^T$ | $\frac{1}{\sqrt{2}}[1\ \ 0\ \ 0\ \ -1]^T$ |
| 14 | $\frac{1}{2}[1\ \ 1\ \ -1\ \ 1]^T$ | $\frac{1}{\sqrt{2}}[0\ \ 1\ \ -1\ \ 0]^T$ |
| 15 | $\frac{1}{2}[1\ \ -1\ \ 1\ \ 1]^T$ | $\frac{1}{\sqrt{2}}[1\ \ 0\ \ 0\ \ 1]^T$ |
| 16 | $\frac{1}{2}[1\ \ -1\ \ -1\ \ -1]^T$ | $\frac{1}{\sqrt{2}}[0\ \ -1\ \ -1\ \ 0]^T$ |

Conventional codebook design is not optimized for Rotated Dual Polarized (RDP) antenna conditions. Accordingly, there is a need for codebook designs that are optimized for RDP antenna conditions.

SUMMARY OF THE INVENTION

The present invention has been made to address the above-described problems occurring in the prior art and to provide at least the advantages described below.

According to an aspect of the present invention, a code word selection method performed by a User Equipment (UE) in a wireless communication system is provided. The method includes generating a rotation matrix using previously selected codeword; generating a new differential code book using the rotation matrix and a differential code book; selecting a code word from the new differential code book; and performing data transmission using the selected code word.

According to another aspect of a present invention, a code word selection method performed by an Enhanced Node B (eNB) in a wireless communication system is provided. The method includes generating a rotation matrix using previously selected codeword; generating a new differential code book using the rotation matrix and a differential code book; selecting a code word from the new differential code book; and performing data transmission using the selected code word.

BRIEF DESCRIPTION OF THE DRAWINGS

The above and other aspects, features, and advantages of the present invention will be more apparent from the following detailed description taken in conjunction with the accompanying drawings, in which:

FIG. 2 is a diagram illustrating Multiple Input Single Output (MISO) antenna scenarios;

DETAILED DESCRIPTION OF EMBODIMENTS OF THE INVENTION

Figure 1:
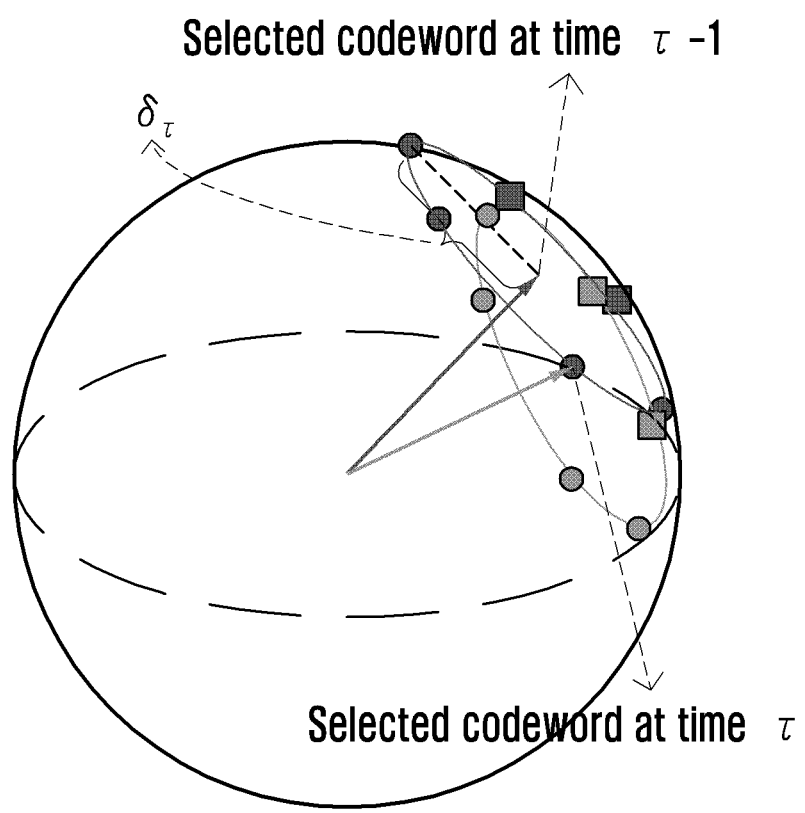
FIG. 1 is a diagram illustrating operations of a polar-cap differential codebook.

Hereinafter, embodiments of the present invention will be described with reference to the accompanying drawings. The same or similar components may be designated by the same or similar reference numerals although they are illustrated in the different drawings. Detailed descriptions of constructions or processes known in the art may be omitted to avoid obscuring the subject matter of the present invention. Various specific matters found in the following description, such as specific components, etc., are merely included to help provide a general understanding of the present invention. Accordingly, various changes and modifications can be made thereto without departing from the technical spirit and scope of the present invention.

Herein, the term "user" may refer to a terminal such as a user-operated terminal, a user operating such a terminal, and/or a combination of hardware and/or software included in such a terminal.

Polar-cap differential codebooks according to embodiments of the present invention can be applied, not only to temporally/spatially correlated channels, but also to rotate dual-polarized MISO antenna scenarios.

Figure 3:
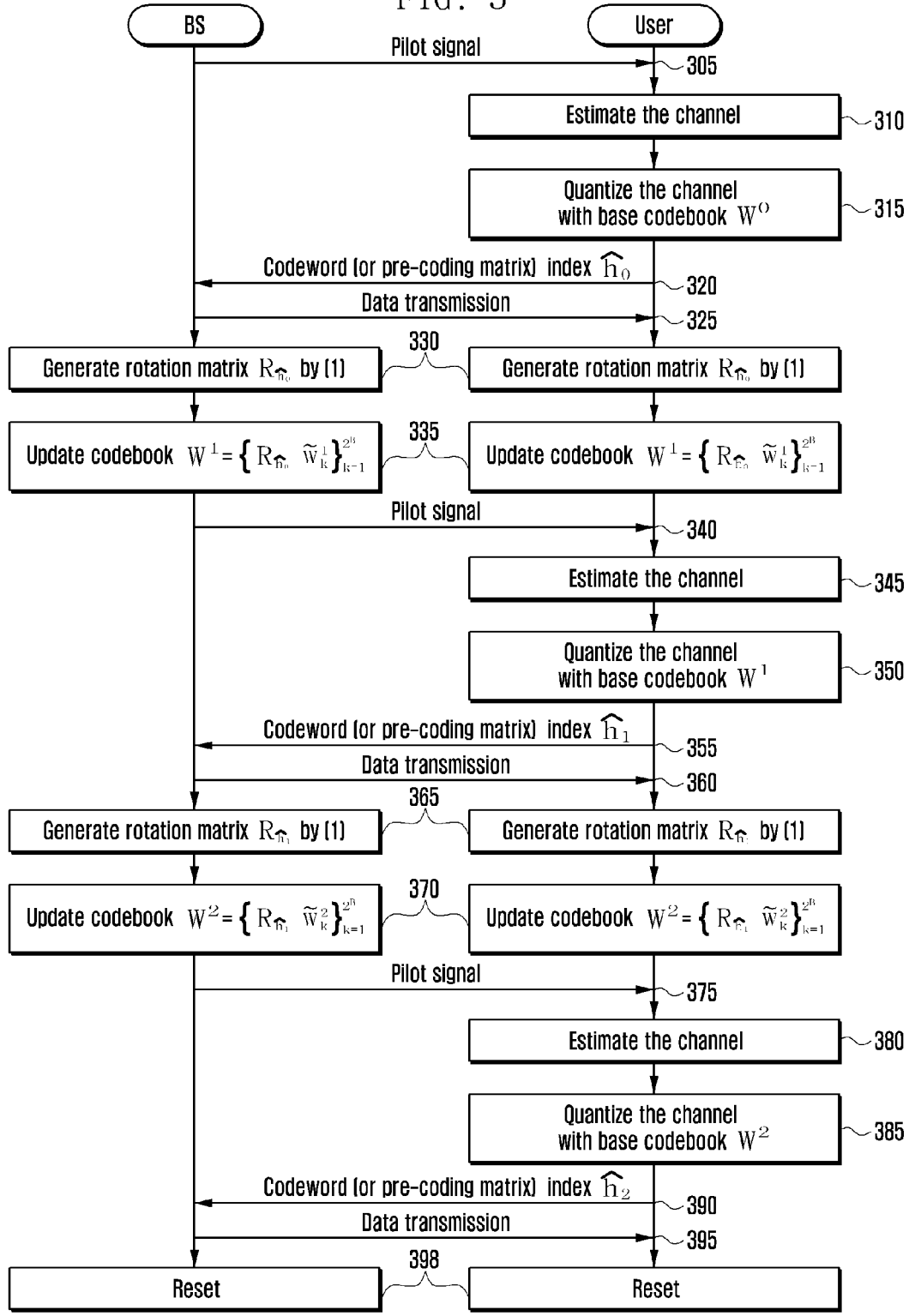
FIG. 3 is a flowchart illustrating a polar-cap differential codebook method according to an embodiment of the present invention.

FIG. 3 is a flowchart illustrating a polar-cap differential codebook method according to an embodiment of the present invention. A procedure using a polar-cap differential codebook according to an embodiment of the present invention is described as follows. Referring to FIG. 2, a Base Station (BS) transmits a pilot signal and a user receives the pilot signal in step 305. The user estimates the channel in step 310. At a time instant $\tau=0$, a user selects an appropriate codeword (or pre-coding matrix) from a fixed base codebook $\mathcal{W}^0 = \{w_1^0 \ldots w_{2^B}^0\}$ in step 315. An LTE codebook may be used as a candidate for the base codebook. The selected codeword (or pre-coding matrix) is denoted as $\hat{h}_0$, and the user feeds back the index of $\hat{h}_0$ to the BS in step 320. Then a data transmission between the BS and the user occurs in step 325.

Next, for each of time instants $\tau=1, 2, \ldots, T_{max}$, the user and the BS both generate the rotation matrix $$R_{\hat{h}_{\tau-1}},$$

which rotates basis of the polar-cap differential codebook, $\tilde{w}_1^\tau$, to the previously selected codeword (or pre-coding matrix) $\hat{h}_{\tau-1}$ in step 330. In the present example, it is assumed that $T_{max}=2$. The basis vector $\tilde{w}_1^\tau$ is described in further detail herein below.

$$R_{\hat{h}_{\tau-1}}$$

includes two unitary matrices defined according to Equation 5 as follows:

$$R_{\hat{h}_{\tau-1}} = [\hat{h}_{\tau-1} \ \hat{h}_{\tau-1}^\perp][\tilde{w}_1^\tau \ \tilde{w}_1^{\tau\perp}]^H \qquad (5)$$

In Equation 1, $w^\perp$ refers to $n\times(n-1)$ space orthogonal to $n\times 1$ vector w. It is easy to see that $$\hat{h}_{\tau-1} = R_{\hat{h}_{\tau-1}} \tilde{w}_1^{\boxplus}.$$

Methods for building $R_{\hat{h}_{\tau-1}}$ are described in further detail herein below.

Next, all the codewords in $\tilde{\mathcal{W}}$ are rotated by $$R_{\hat{h}_{\tau-1}}$$

and a new codebook $$W^\tau = \{R_{\hat{h}_{\tau-1}} \tilde{w}_k^\tau\}$$

for $k=1, \ldots, 2^B$ for time $\tau$ is formed.

Steps 340 through 370 correspond to a process similar to that described above with respect to steps 305 through 335. However, in step 350 which corresponds to step 315, the user chooses an appropriate codeword (or pre-coding matrix) from $W^\tau$ for channel quantization from the new code book formed in step 334 and feeds back the index of the codeword (or pre-coding matrix) to BS in step 355. The above-described process is repeated in steps 375 through 395. The process repeats until a preset condition is satisfied. The preset condition can be a number of times that the process has been repeated.

According to an embodiment of the present invention, at time $T_{max}+1$, the process is reset and $\tau$ is fixed to 0 again in step 398.

A methodology for designing a polar-cap differential codebook according to an embodiment of the present invention is described as follows.

According to an embodiment of the present invention, a rotation matrix $$R_{\hat{h}_{\tau-1}}$$

and $n_t \times 1$ codewords of the polar-cap codebook $\tilde{\mathcal{W}}^\tau = \{\tilde{w}_1^\tau \ldots \tilde{w}_{2^B}^\tau\}$ are designed, where $n_t$ is the number of transmit antennas. In IEEE 802.16m, $$R_{\hat{h}_{\tau-1}}$$

is computed through a Household transformation method, and the polar-cap codebook is generated according to Equation 6 as follows:

$$W^\tau = \left\{ \begin{bmatrix} 1 \\ 0 \\ \vdots \\ 0 \end{bmatrix}, \begin{bmatrix} \sqrt{1-\delta_\tau^2} \\ \delta_\tau f_2 \end{bmatrix}, \ldots, \begin{bmatrix} \sqrt{1-\delta_\tau^2} \\ \delta_\tau f_{2^B} \end{bmatrix} \right\} \quad (6)$$

In Equation 6, $\delta_\tau$ is a design parameter, and $k=2, 3, \ldots 2^B$ are $(n_t-1)\times 1$ vectors. In this case, the first codeword $\tilde{w}_1^\tau = [1 \, 0 \ldots 0]^E$ is the basis of the polar-cap differential codebook. If the channel is highly temporally correlated, then $\delta_\tau$ must be small. $\delta_\tau$ can be fixed for simplicity, or may vary according to time instant $\tau$, which results in a different differential codebook $\tilde{W}^\tau$ for each $\tau$ for better quantization. This structure of the polar-cap differential codebook can be used to track a variation of temporally correlated channels, resulting in reduced channel quantization errors.

The polar-cap differential codebook described above can be modified to cope with a spatially correlated channel as well, in accordance with embodiments of the present invention. To perform such a modification, the basis for the polar-cap differential codebook is changed from $\tilde{w}_1^\tau = [1 \, 0 \ldots 0]^E$ to $\tilde{w}_1^\tau = [1 \, 1 \ldots 1]^E$. Then we can build a unitary matrix [w̃] $[\tilde{w}_1^\tau \tilde{w}_1^{\tau\perp}] = F^{(0)}$ where $F^{(0)}$ is denoted according to Equation 7 as follows:

$$F^{(0)} = \frac{1}{\sqrt{n_t}} \begin{bmatrix} 1 & \ldots & \ldots \\ \ldots & e^{\frac{j2\pi(m-1)(n-1)}{n_t}} & \ldots \\ 1 & \ldots & \ldots \end{bmatrix}. \quad (7)$$

Then, other codewords in the polar-cap differential codebook are rotated with $F^{(0)}$ as $\tilde{\mathcal{W}}^\tau = \{\tilde{w}_1^\tau, F^{(0)}\tilde{w}_2^\tau \ldots, F^{(0)}\tilde{w}_{2^B}^\tau\}$. Note that $\tilde{w}_1^\tau$ is not rotated with $F^{(0)}$ because it has already been changed.

The rotation matrix is also changed according to Equation 8 as follows:

$$R_{\hat{h}_{\tau-1}} = [\hat{h}_{\tau-1} \, \hat{h}_{\tau-1}^\perp][\tilde{w}_1^\tau \, \tilde{w}_1^{\tau\perp}]^H \quad (8)$$

$$\mathcal{G}(\sqrt{n_t} \, \text{diag}\{\hat{h}_{\tau-1}\} F^{(0)}) F^{(0)H}$$

According to Equation 8, g (A) is Gram-Schmidt orthogonalization of matrix A. If previously selected codeword (or pre-coding matrix) $\hat{h}_{\tau-1}$ has a constant modulus (i.e., its elements have equal gain), then $\sqrt{n_t}\text{diag}\{\hat{h}_{\tau-1}\}F^{(0)}$ itself is an orthogonal matrix so that a Gram-Schmidt orthogonalization process is not required in order to obtain a unitary matrix $[\hat{h}_{\tau-1} \, \hat{h}_{\tau-1}^\perp]$.

In addition to the modification of the basis and the rotation matrix, new differential codewords which have a DFT form according to the following Equation 9 are added to the polar-cap differential codebook:

$$\tilde{w}_k^\tau = \frac{1}{\sqrt{n_t}}[1 \, e^{j2\theta} \, e^{j2\theta} \ldots e^{j(n_t-1)\theta}]^T \quad (9)$$

If the previously selected codeword (or pre-coding matrix) $\hat{h}_{\tau-1}$ is a DFT codeword, then the modified polar-cap differential codebook generates DFT codewords (or pre-coding matrices) with a phase adjustment based on $\hat{h}_{\tau-1}$, which results in better channel tracking for spatially correlated channels.

Polar-cap differential codebooks for dual-polarized channels according to embodiments of the present invention are described as follows. Because all channel elements have the same or similar XPD values in an RDP MISO scenario, RBD structure differential codewords that have the constant modulus property, such as in LTE rank one codebook, can be designed.

An approach for designing polar-cap differential codebooks for dual-polarized channels utilizing a rotated block-diagonal structure according to an embodiment of the present invention is described as follows. Rotated block-diagonal codewords (or pre-coding matrices) in Table 1 can be treated as rotating 2×1 DFT block vectors, $$\frac{1}{\sqrt{2}}[1 \, e^{j\theta_k} \, 0 \, 0]^T$$

or $$\frac{1}{\sqrt{2}}[0 \, 0 \, -1 \, e^{j\theta_k}]^T,$$

with Givens rotation matrix G. The minimum phase differences of upper and lower DFT blocks are both $$\frac{\pi}{2}$$

(i.e., the phase difference between $G^{-1}w_1$ where $\theta_1=0$ and $G^{-1}w_{10}$, where $$\theta_{10} = \frac{\pi}{2}$$

for the upper block and $G^{-1}w_2$ and $G^{-1}w_9$ for the lower block). Therefore, in order to obtain precise rotated block-diagonal codewords (or pre-coding matrices), differential codewords that can adjust a phase of DFT block of codewords (or pre-coding matrices) are designed. The LTE rank one rotated block-diagonal codewords (or pre-coding matrices) have a block structure according to the following Equation 10 for k=1, . . . 4, 9, . . . 12:

$$w_k = 1/2 \, [1 \, e^{j\theta k} \pm 1 \pm e^{j\theta k}]^T \quad (10)$$

A differential codeword $\tilde{w}_k^E$ that has the form according to the following Equation 11 can alter the phase of RBD codewords (or pre-coding matrices):

$$\tilde{w}_k^\tau = 1/2 \, [1 \, e^{j\phi k} \, 1 \, e^{\pm j\phi k}]^T \quad (11)$$

If a previously selected codeword (or a pre-coding matrix) $\hat{h}_{\tau-1}$ is of the form $w_k$, which has a constant modulus, then the following codeword according to Equation 12 is used:

$$R_{\hat{h}_{\tau-1}} \tilde{w}_k^\tau = \mathcal{G}(\sqrt{n_t} \, \mathrm{diag}\{\hat{h}_{\tau-1}\} F^{(0)}) F^{(0)H} \tilde{w}_k^\tau \quad (12)$$

$$= 2 \mathrm{diag}\{\hat{h}_{\tau-1}\} \tilde{w}_k^\tau$$

$$= \frac{1}{2} \begin{bmatrix} 1 \\ e^{j(\theta_k + \phi_k)} \\ \pm 1 \\ \pm e^{j(\theta_k \pm \phi_k)} \end{bmatrix}$$

The codeword according to Equation 12 is an RBD codeword (or pre-coding matrix) with a phase adjustment. $\phi_k$ according to Equation 5 must be less than $$\frac{\pi}{2},$$

because of the minimum phase difference in LTE codebook. Note that the above codebook can be even more updated according to a time instant, i.e., the phase $\phi k$ according to Equation 5 decreases as $\tau$ increases for more precise channel quantization.

An approach for designing polar-cap differential codebooks for dual-polarized channels utilizing spatial correlation according to an embodiment of the present invention is described as follows. If Tx antennas are nearly deployed, a long-term spatial correlation matrix R can be obtained. In a DP channel, R can be modeled according to the following Equation 13:

$$R = \begin{bmatrix} R^{(1)} & 0_{\frac{n_t}{2} \times \frac{n_t}{2}} \\ 0_{\frac{n_t}{2} \times \frac{n_t}{2}} & R^{(2)} \end{bmatrix} \quad (13)$$

In Equation 13, where k in $R^{(k)}$ represents a polarized antenna group index, any kind of spatial correlation model for $R^{(k)}$ may be adopted in accordance with embodiments of the present invention. An exponential model may be adopted according to the following Equation 14:

$$R^{(k)} = \begin{bmatrix} 1 & e^{-j\phi^{(k)}} & \cdots & e^{-j(\frac{n_t}{2}-1)\phi^{(k)}} \\ e^{j\phi^{(k)}} & 1 & & \\ \vdots & & \ddots & \\ e^{j(\frac{n_t}{2}-1)\phi^{(k)}} & & & 1 \end{bmatrix} \quad (14)$$

In Equation 14, the phase $\phi^{(k)}$ is a uniform random variable drawn from 0 to $2\pi$. Note that $\phi^{(k)}$ is is independent from one polarized antenna group to another, because signals transmitted from different polarized antenna group experience different path fading even though they are located nearby. This independence is depicted in FIG. 4.

Figure 4:
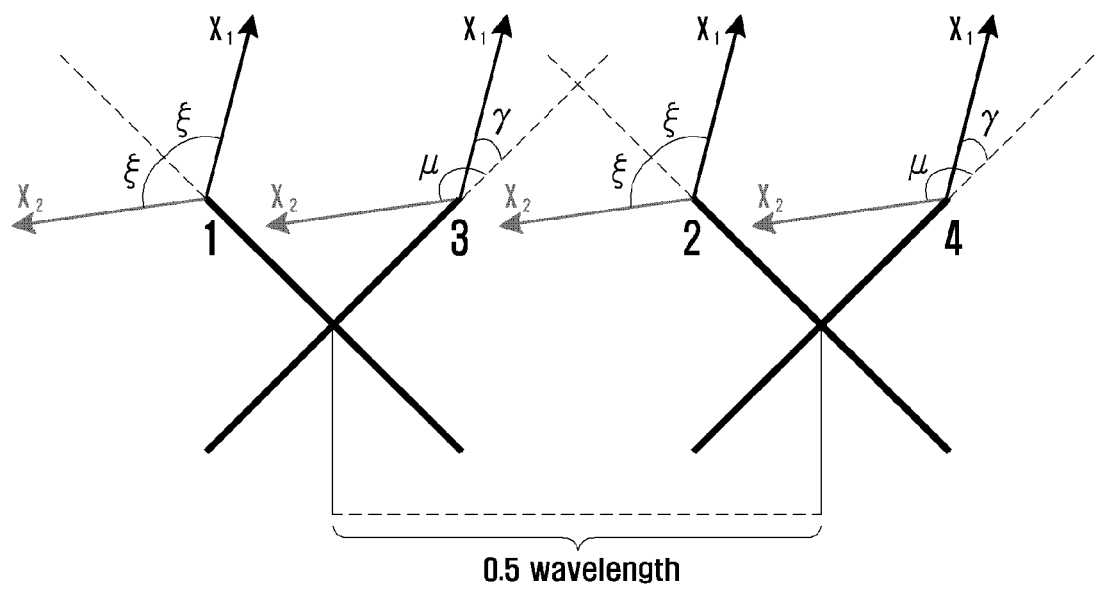
FIG. 4 is a diagram illustrating signal propagation from a spatially correlated RDP antenna according to an embodiment of the present invention.

FIG. 4 is a diagram illustrating signal propagation from a spatially correlated RDP antenna according to an embodiment of the present invention.

Referring to FIG. 4, the phases of signals $x_1$ and $x_2$ are the same with respect to one polarized antenna group (antenna 1 and 2). However, these signals are different with respect to another polarized antenna group (antenna 3 and 4), even though the two antenna groups are closely located with each other. Therefore, even though the same spatial correlation $R^{(1)}$ exists for one polarized antenna group, another polarized antenna group can experience different spatial correlation $R^{(2)}$. However, this situation does not apply to small-spaced Uniform Linear Array (ULA) antenna scenarios.

Based on this assumption, another differential codebook is designed according to the following Equation 15 to adjust the phase difference of the two polarization antenna groups:

$$\tilde{w}_k^\tau = 1/2 \, [1 \, 1 \, i^{j\phi k} \, e^{\pm j\phi l}]^T \quad (15)$$

In Equation 15, $\phi k$ must be less than $$\frac{\pi}{2},$$

due to the minimum phase difference in LTE codebook. The above codebook can be even further updated according to a time instant (i.e., the phase $\phi k$ in Equation 15 decreases as i increases for more precise channel quantization.

Polar-cap differential codebook for higher ranking transmissions according to embodiments of the present invention are described as follows. A differential codebook for higher rank transmission can be designed in a manner similar to that described above for dual-polarized channels. In the following Equation 16, $\tilde{W}_k^E$ is a k-th codeword of rank $n_t$ differential codebook with orthogonal columns:

$$\tilde{W}_k^\tau = [\tilde{w}_{k,1}^\tau \, \tilde{w}_{k,2}^\tau \ldots \tilde{w}_{k,n_t}^\tau] \quad (16)$$

The first column of $\tilde{W}_k^E$, i.e., $\tilde{w}_{k,1}^E$ can be any vector from Equations 13, 14, or 15, or any other non-constant modulus vector. $\tilde{W}_k^E$ can also be generated according to the following Equation 17:

$$\tilde{W}_k^\tau = [\tilde{w}_{k,1}^\tau \, \tilde{w}_{k,1}^{\tau,\perp}] \quad (17)$$

$$= \mathcal{G}(\sqrt{n_t} \, \mathrm{diag}(\tilde{w}_{k,1}^\tau) F^{(0)}).$$

In Equation 17, g (A) is Gram-Schmidt orthogonalization of matrix A and $F^{(0)}$ is from Equation 7. Then $\tilde{w}_{k,2}^\tau \ldots \tilde{w}_{k,n_E}^\tau$ are nothing but the second, . . . , $n_r$-th columns of $\tilde{W}_k^E$. Note that if $\tilde{w}_{k,1}^E$ is from Equation 13, 14, or 15, then a Gram-Schmidt orthogonalization process is not required, because $\sqrt{n_t}\mathrm{diag}(\tilde{w}_{k,1}^\tau)F^{(0)}$ matrix.

A method for generating $R_{\hat{h}_{\tau-1}}$ for high rank differential codebook according to an embodiment of the present invention is described as follows. In the following example, a general rank m is used, and it is assumed that at time t -1, k-th codeword (or pre-coding matrix) $W_k^{\tau-1}$ is selected according to the following Equation 18:

$$W_k^{\tau-1} = [w_{k,1}^{\tau-1} \ldots w_{k,m}^{\tau-1}] \quad (18)$$

If the Channel Quality Information (CQI) of $w_{k,1}^{\tau-1}$ is greater than that of $w_{k,l}^{\tau-1}$ for l=2, . . . m, let $\hat{h}_{\tau-1} = w_{k,1}^{E-1}$. Otherwise, $\hat{h}_{\tau-1} = w_{k,n}^{E-1}$ when n-th column of $W_k^{\tau-1}$ has the highest CQI value. Then, the same method as according to Equations 5 or 8 is applied to generate $$R_{\hat{h}_{\tau-1}}.$$

If the previously selected codeword (or pre-coding matrix) is constant modulus, the following Equation 19 is applied:

$$R_{\hat{h}_{\tau-1}} = \sqrt{n_t}\,\mathrm{diag}(\hat{h}_{\tau-1}) \quad (19)$$

Two approaches for rotating differential codewords $\tilde{W}_k^E$ with $$R_{\hat{h}_{\tau-1}}$$

according to embodiments of the present invention are described as follows.

In a fixed approach for rotating differential codewords according to an embodiment of the present invention, differential codewords are fixed according to Equation 16 and rotated with $$R_{\hat{h}_{\tau-1}}$$

according to the following Equation 20:

$$W_k^\tau = R_{\hat{h}_{\tau-1}} \tilde{W}_k^\tau \quad (20)$$

However, this approach does not guarantee that a rotated block-diagonal structure or other preferred structure for the dominant column of $W_k^\tau$, which has larger CQI if the first column of $W_k^{\tau-1}$ i.e., $w_{k,1}^{\tau-1}$ does not have the largest CQI, will be obtained.

In a flexible approach for rotating codewords according to an embodiment of the present invention, in order to obtain a rotated block-structure or other preferred structure for the dominant column of $W_k^\tau$, the columns of $\tilde{W}_k^E$ are interchanged according to the dominant column of $W_k^{\tau-1}$. More specifically, if the first column of $W_k^{\tau-1}$ has the largest CQI, then $\tilde{W}_k^E$ is determined according to Equation 16. If some other column n of $W_k^{\tau-1}$ has the largest CQI, then the columns of $\tilde{W}_k^E$ are interchanged according to the following Equation 21 and rotated with $R_{\hat{h}_{\tau-1}}$:

$$\tilde{W}_k^\tau = [\tilde{w}_{k,n}^\tau \ldots \tilde{w}_{k,n-1}^\tau \tilde{w}_{k,1}^\tau \tilde{w}_{k,n+1}^\tau \ldots \tilde{w}_{k,n_t}^\tau] \quad (21)$$

The results Monte-Carlo simulations with 10000 channel realization using a Spatial Channel Model (SCM) channel model, which confirm the effectiveness of codebooks according to embodiments of the present invention, are described as follows. The present example for the simulation assumes a carrier frequency of 2 GHz, channel instantiation interval T of 5 ms, and user speed of 3 km/h similar to the 3 GPP LTE-Advanced setup for CL-MIMO systems. A 0.5 wavelength antenna spacing is set at the BS with an angle spread of 8 degrees to achieve spatial correlation. An Urban Micro scenario is also assumed in the present example. In the present example, $T_{max}=3$ channel uses, which corresponds to 15 ms. Because block fading channels are used in the present example, the channel does not change from the measurement time at each user to actual transmission from the BS. In the present example, $n_{cb}$ denotes a total number of codewords (or pre-coding matrices) in a codebook.

To evaluate the proposed polar-cap differential codebook, specific differential codebooks the following Equations 22 and 23, which correspond to two different approaches:

$$\tilde{W}_{App1}^\tau = \left\{ \frac{1}{2}\begin{bmatrix}1\\1\\1\\1\end{bmatrix}, \frac{1}{2}\begin{bmatrix}1\\e^{j\frac{\pi}{4}}\\1\\e^{j\frac{\pi}{4}}\end{bmatrix}, \frac{1}{2}\begin{bmatrix}1\\e^{-j\frac{\pi}{4}}\\1\\e^{-j\frac{\pi}{4}}\end{bmatrix}, \frac{1}{2}\begin{bmatrix}1\\e^{j\frac{\pi}{8}}\\1\\e^{j\frac{\pi}{8}}\end{bmatrix}, \frac{1}{2}\begin{bmatrix}1\\e^{-j\frac{\pi}{8}}\\1\\e^{-j\frac{\pi}{8}}\end{bmatrix}, \frac{1}{2}\begin{bmatrix}1\\e^{j\frac{\pi}{4}}\\1\\e^{-j\frac{\pi}{4}}\end{bmatrix}, \frac{1}{2}\begin{bmatrix}1\\e^{-j\frac{\pi}{4}}\\1\\e^{j\frac{\pi}{4}}\end{bmatrix}, \frac{1}{2}\begin{bmatrix}1\\e^{j\frac{\pi}{8}}\\1\\e^{-j\frac{\pi}{8}}\end{bmatrix}, \frac{1}{2}\begin{bmatrix}1\\e^{-j\frac{\pi}{8}}\\1\\e^{j\frac{\pi}{8}}\end{bmatrix} \right\} \quad (22)$$

$$\tilde{W}_{App2}^\tau = \left\{ \frac{1}{2}\begin{bmatrix}1\\1\\1\\1\end{bmatrix}, \frac{1}{2}\begin{bmatrix}1\\1\\e^{j\frac{\pi}{4}}\\e^{j\frac{\pi}{4}}\end{bmatrix}, \frac{1}{2}\begin{bmatrix}1\\1\\e^{-j\frac{\pi}{4}}\\e^{-j\frac{\pi}{4}}\end{bmatrix}, \frac{1}{2}\begin{bmatrix}1\\1\\e^{j\frac{\pi}{8}}\\e^{j\frac{\pi}{8}}\end{bmatrix}, \frac{1}{2}\begin{bmatrix}1\\1\\e^{-j\frac{\pi}{8}}\\e^{-j\frac{\pi}{8}}\end{bmatrix}, \frac{1}{2}\begin{bmatrix}1\\1\\e^{j\frac{\pi}{4}}\\e^{-j\frac{\pi}{4}}\end{bmatrix}, \frac{1}{2}\begin{bmatrix}1\\1\\e^{-j\frac{\pi}{4}}\\e^{j\frac{\pi}{4}}\end{bmatrix}, \frac{1}{2}\begin{bmatrix}1\\1\\e^{j\frac{\pi}{8}}\\e^{-j\frac{\pi}{8}}\end{bmatrix}, \frac{1}{2}\begin{bmatrix}1\\1\\e^{-j\frac{\pi}{8}}\\e^{j\frac{\pi}{8}}\end{bmatrix} \right\} \quad (23)$$

The following Equation 24 applies to a codebook according to a third approach:

$$\tilde{W}^\tau_{App3} = \tilde{W}^\tau_{App1} \cup \tilde{W}^\tau_{App2} \setminus \left\{ \begin{bmatrix} 1 \\ 1 \\ e^{j\frac{\pi}{4}} \\ e^{-j\frac{\pi}{4}} \end{bmatrix} \right\}, \quad (24)$$

where \ is a set subtraction operation, such that A\B removes elements that are in set B from set A.

In a Multi-User (MU)-MIMO scenario, it is assumed that there are $n_t=4$ transmit antennas at the BS and one receive antenna at each user, and there are K=4 users that are supported by the BS simultaneously with ZFBF scheme. In this case, the 4 bit 3GPP LTE-Advanced 4Tx codebook is adopted for the base codebook. If multiple users report the same codeword (or pre-coding matrices), this results in a rank deficiency in the concatenated quantized channel matrix [w̃] [Ĥ$_\tau$=[ĥ w̃$^*_{1 \tau,1}$,...,ĥ$_{\tau,k}$]. This case is discarded and another simulation is run in order to obtain the same number of effective channel realizations.

Figure 5:
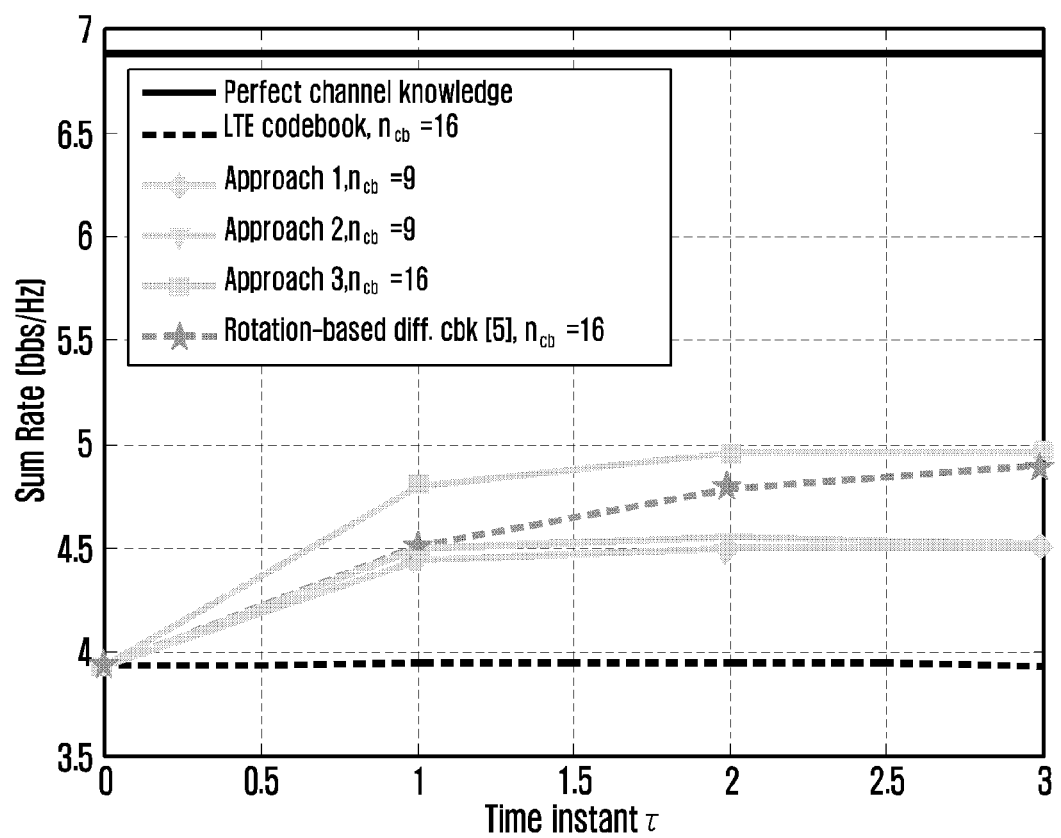
FIG. 5 is a chart illustrating a MU-MIMO simulation for an SCM channel model according to an embodiment of the present invention.

FIG. 5 is a chart illustrating a MU-MIMO simulation for an SCM channel model according to an embodiment of the present invention.

Referring to FIG. 5, the sum-rate of various feedback schemes is plotted according to the time instant. In the example according to FIG. 5, the Signal-to-Noise Ratio (SNR) is 10 dB. As shown in FIG. 5, the performances of both the first and second approaches according to Equations 22 and 23 are better than performances using the LTE codebook with only $n_{cb}$=9. Also, the third approach according to Equation 24 outperforms the rotation-based differential codebook with the same feedback overhead.

Figure 6:
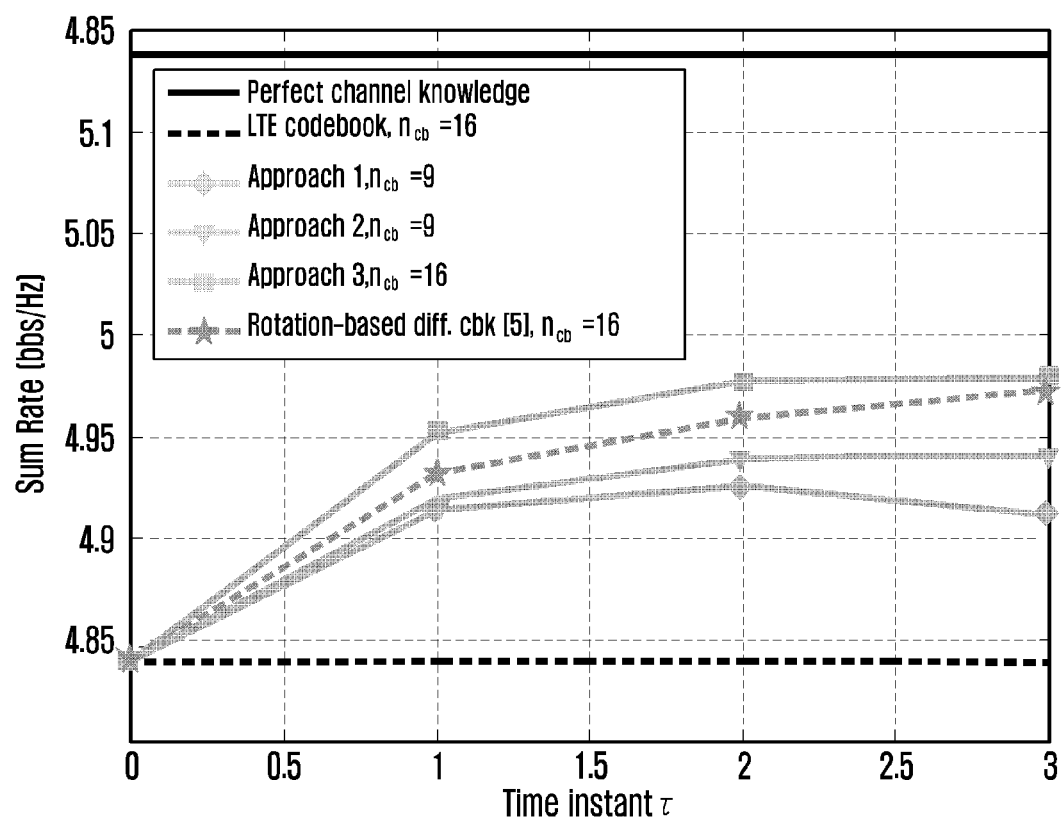
FIG. 6 is a chart illustrating an SU-MIMO simulation for an SCM channel model according to an embodiment of the present invention.

FIG. 6 is a chart illustrating an SU-MIMO simulation for an SCM channel model according to an embodiment of the present invention.

In a Rank one Single-User (SU)-MIMO scenario, the performance of rank one SU-MIMO beamforming with $n_t$=4 RDP, and two ULA receive antennas is plotted based on an SCM channel model, as shown in FIG. 6. Again, all the differential codebooks outperform LTE rank one codebook and the third approach according to Equation 24 outperforms the rotation-based differential codebook with the same feedback overhead.

Figure 7:
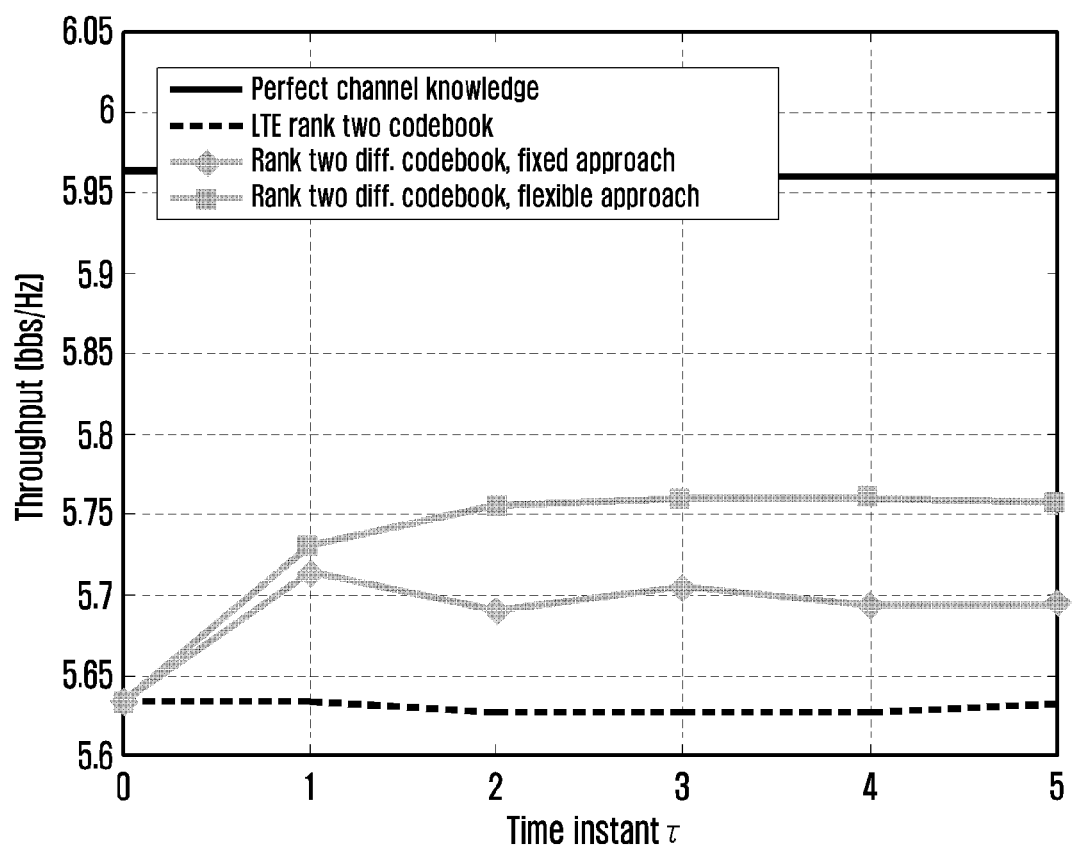
FIG. 7 is a chart illustrating another SU-MIMO simulation for an SCM channel model according to an embodiment of the present invention.

FIG. 7 is a chart illustrating another SU-MIMO simulation for an SCM channel model according to an embodiment of the present invention.

In a rank two SU-MIMO scenario, in order to simulate rank two SU-MIMO, a rank two codebook according to Equation 17 is based on the third approach according to Equation 24. The second column of $\tilde{W}_k^E$ in Equation 17 is selected as the second column of a rank two codebook. The performance of a rank two SU-MIMO with $n_t$=4 RDP, and two ULA receive antennas are plotted based on the SCM channel model in FIG. 7. In the present example, all limited feedback schemes have B=4 bits feedback. The proposed rank two differential codebooks outperform an LTE rank two codebook. Moreover, flexible approach has more gain than fixed approach as expected.

Figure 8:
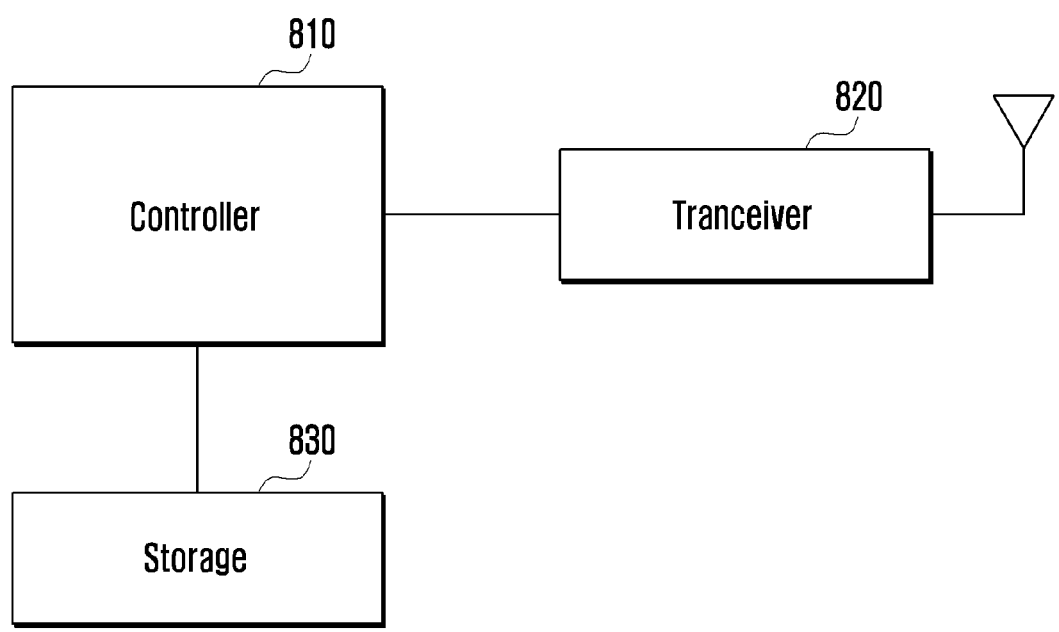
FIG. 8 is a block diagram illustrating a configuration of a User Equipment (UE) according to an embodiment of the present invention.

FIG. 8 is a block diagram illustrating a configuration of a User Equipment (UE) according to an embodiment of the present invention.

Referring to FIG. 8, the UE includes a controller 810, a transceiver 820, and a storage unit 830. The UE may include additional units not shown here for the purpose of clarity.

The transceiver 820 receives and transmits data and control signals. The storage unit 830 is responsible for storing program data related to the operations of the UE and may be divided into a program region and a data region. The storage unit 830 may be implemented with at least one of volatile and nonvolatile storage media. Volatile media includes semiconductor memories such as Random Access Memory (RAM), Dynamic RAM (DRAM), and Static RAM (SRAM), and nonvolatile media includes memory such as a hard disk. In the present invention, the storage unit 830 is capable of storing the codebooks.

The controller 810 controls the transceiver 820 and the storage unit 830 to control the overall operations described above according to embodiments of the present invention.

Figure 9:
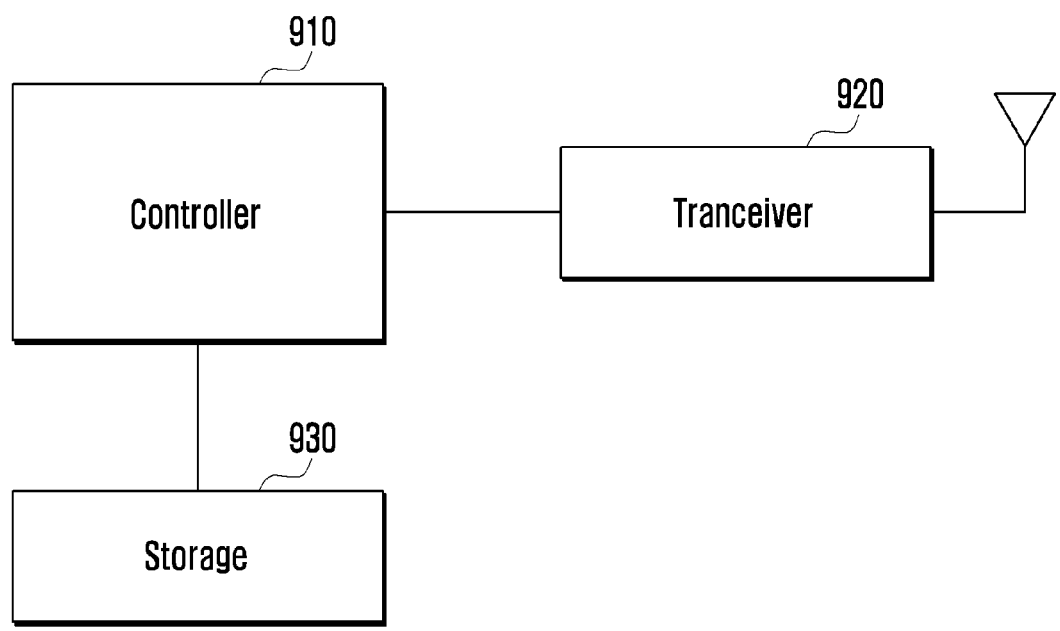
FIG. 9 is a block diagram illustrating a configuration of a Base station (BS) according to an embodiment of the present invention.

FIG. 9 is a block diagram illustrating a configuration of a Base station (BS) according to an embodiment of the present invention.

Referring to FIG. 9, the BS includes a controller 910, a transceiver 920, and a storage unit 930. The BS may include additional units not shown here for the purpose of clarity.

The transceiver 920 receives and transmits data and control signals. The storage unit 930 is responsible for storing program data related to the operations of the BS and may be divided into a program region and a data region. The storage unit 930 may be implemented with at least one of volatile and nonvolatile storage media. The volatile media include semiconductor memories such as RAM, DRAM, and SRAM, and the nonvolatile media include hard disk. In the present invention, the storage unit 930 is capable of storing the codebooks.

The controller 910 controls the transceiver 920 and the storage unit 930 to control overall operations described above according to embodiments of the present invention.

Hereinafter, examples of codebooks according to embodiments of the present invention are provided. The following examples include multiple sets of 4-bit polar-cap differential codebook of rank 4 when four transmission antennas are used. For a given rank 4 codeword A=[$a_1$, $a_2$, $a_3$, $a_4$] where $a_k$ is 4×1 vector, a rank m differential codeword is given as A(:,1:m)=[$a_1$, ..., $a_m$] where m≤4. Any combination of codewords listed below can be used as a codebook in accordance with embodiments of the present invention. In the following examples, irrational numbers are quantized up to the thousandth digit as:

$$\frac{1}{2}e^{j\frac{\pi}{2}} = \frac{1}{2}j, \ \frac{1}{2}e^{j\frac{\pi}{4}} = 0.3536 + 0.3536j, \ \frac{1}{2}e^{j\frac{\pi}{8}} = 0.4619 + 0.1913,$$

$$\frac{1}{2}e^{j\frac{\pi}{16}} = 0.4904 + 0.0975j, \ \frac{1}{2}e^{j\frac{\pi}{32}} = 0.4976 + 0.0490j.$$

Codebook Set 1:

1 basis codeword
4 *DFT* codewords with $\pi/8$ and $\pi/16$
6 approach 1 codewords with $\pi/4$ and $\pi/8$
5 approach 2 codewords with $\pi/4$ and $\pi/8$ $$\text{codebook}(:,:,1) = \begin{matrix} 0.5000 & 0.5000 & 0.5000 & 0.5000 \\ 0.5000 & 0+0.5000j & -0.5000 & 0-05000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913 & -0.1913+0.4619j & 0.4619+0.1913j \end{matrix}$$

$$\text{codebook}(:,:,4) = \begin{matrix} 0.5000 & 0.5000 & 0.5000 & 0.5000+0.0000j \\ 0.4904+0.0975j & -0.0975+0.4904j & -0.4904-0.0975j & 0.0975-0.4904j \\ 0.4619+0.1913j & -0.4619-0.1913j & 0.4619+0.1913j & -0.4619-0.1913j \\ 0.4157+0.2778j & 0.2778-0.4157j & -0.4157-0.2778j & -0.2778+0.4157j \end{matrix}$$

$$\text{codebook}(:,:,5) = \begin{matrix} 0.5000 & 0.5000 & 0.5000+0.0000j & 0.5000-0.0000j \\ 0.4904-0.0975j & 0.0975+0.4904j & -0.4904+0.0975j & -0.0975-0.4904j \\ 0.4619-0.1913j & -0.4619+0.1913j & 0.4619-0.1913j & -0.4619+0.1913j \\ 0.4157-0.2778j & -0.2778-0.4157j & -0.4157+0.2778j & 0.2778+0.4157j \end{matrix}$$

$$\text{codebook}(:,:,6) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000 & 0.5000 & 0.5000 \\ 0.3536-0.3536j & 0.3536+0.3536j & -0.3536+0.3536 & -0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000 & 0.5000 & 0.5000-0.0000j \\ 0.4619+0.1913j & -0.1913+0.4619j & -0.4619-0.1913j & 0.1913-0.4619j \\ 0.5000 & -0.5000 & 0.5000 & -0.5000+0.0000j \\ 0.4619+0.1913j & 0.1913-0.4619j & -0.4619-0.1913j & -0.1913+0.4619j \end{matrix}$$

$$\text{codebook}(:,:,11) = \begin{matrix} 0.5000 & 0.5000 & 0.5000 & 0.5000+0.0000j \\ 0.4619-0.1913j & 0.1913+0.4619j & -0.4619+0.1913j & -0.1913-0.4619j \\ 0.5000 & -0.5000 & 0.5000 & -0.5000-0.0000j \\ 0.4619-0.1913j & -0.1913-0.4619j & -0.4619+0.1913j & 0.1913+0.4619j \end{matrix}$$

$$\text{codebook}(:,:,12) = \begin{matrix} 0.5000 & 0.5000 - 0.0000j & 0.5000 - 0.0000j & 0.5000 + 0.0000j \\ 0.5000 & -0.0000 + 0.5000j & -0.5000 + 0.0000j & -0.0000 - 0.5000j \\ 0.3536 + 0.3536j & -0.3536 - 0.3536j & 0.3536 + 0.3536j & -0.3536 - 0.3536j \\ 0.3536 + 0.3536j & 0.3536 - 0.3536j & -0.3536 - 0.3536j & -0.3536 + 0.3536j \end{matrix}$$

$$\text{codebook}(:,:,13) = \begin{matrix} 0.5000 & 0.5000 - 0.0000j & 0.5000 + 0.0000j & 0.50000 + 0.0000j \\ 0.5000 & -0.0000 + 0.5000j & -0.5000 - 0.0000j & -0.0000 - 0.5000j \\ 0.3536 - 0.3536j & -0.3536 + 0.3536j & 0.3536 - 0.3536j & -0.3536 + 0.3536j \\ 0.3536 - 0.3536j & -0.3536 - 0.3536j & -0.3536 + 0.3536j & 0.3536 + 0.3536j \end{matrix}$$

$$\text{codebook}(:,:,14) = \begin{matrix} 0.5000 & 0.5000 - 0.0000j & 0.5000 & 0.5000 + 0.0000j \\ 0.5000 & -0.0000 + 0.5000j & -0.5000 & -0.0000 - 0.5000j \\ 0.3536 + 0.3536j & -0.3536 - 0.3536j & 0.3536 + 0.3536j & -0.3536 - 0.3536j \\ 0.3536 - 0.3536j & -0.3536 - 0.3536j & -0.3536 + 0.3536j & 0.3536 + 0.3536j \end{matrix}$$

$$\text{codebook}(:,:,15) = \begin{matrix} 0.5000 & 0.5000 - 0.0000j & 0.5000 + 0.0000j & 0.5000 - 0.0000j \\ 0.5000 & 0 + 0.5000j & -0.5000 - 0.0000j & -0.0000 - 0.5000j \\ 0.4619 + 0.1913j & -0.4619 - 0.1913 & 0.4619 + 0.1913j & -0.4619 - 0.1913j \\ 0.4619 + 0.1913j & 0.1913 - 0.4619j & -0.4619 - 0.1913j & -0.1913 + 0.4619j \end{matrix}$$

$$\text{codebook}(:,:,16) = \begin{matrix} 0.5000 & 0.5000 & 0.5000 - 0.0000j & 0.5000 + 0.0000j \\ 0.5000 & -0.0000 + 0.5000j & -0.5000 + 0.0000j & 0.0000 - 0.5000j \\ 0.4619 - 0.1913j & -0.4619 + 0.1913j & 0.4619 - 0.1913j & -0.4619 + 0.1913j \\ 0.4619 - 0.1913j & -0.1913 - 0.4619j & -0.4619 + 0.1913j & 0.1913 + 0.4619j \end{matrix}$$

Codebook Set 2:

1 basis codeword
4 DFT codewords with $\pi/8$ and $\pi/32$
6 approach 1 codewords with $\pi/4$ and $\pi/8$
5 approach 2 codewords with $\pi/4$ and $\pi/8$ $$\text{codebook}(:,:,1) = \begin{matrix} 0.5000 & 0.5000 & 0.5000 & 0.5000 \\ 0.5000 & 0 + 0.5000j & -0.5000 & 0 - 05000j \\ 0.5000 & -0.5000 & 0.5000 & -0.5000 \\ 0.5000 & 0 - 0.5000j & -0.5000 & 0 + 0.5000j \end{matrix}$$

$$\text{codebook}(:,:,2) = \begin{matrix} 0.5000 & 0.5000 & 0.5000 & 0.5000 \\ 0.4619 + 0.1913j & -0.1913 + 0.4619j & -0.4619 - 0.1913j & 0.1913 - 0.4619j \\ 0.3536 + 0.3536j & -0.3536 - 0.3536j & 0.3536 + 0.3536j & -0.3536 - 0.3536j \\ 0.1913 + 0.4619j & 0.4619 - 0.1913j & -0.1913 - 0.4619j & -0.4619 + 0.1913j \end{matrix}$$

$$\text{codebook}(:,:,3) = \begin{matrix} 0.5000 & 0.5000 & 0.5000 & 0.5000 \\ 0.4619 - 0.1913j & 0.1913 + 0.4619j & -0.4619 + 0.1913j & -0.1913 - 0.4619j \\ 0.3536 - 0.3536j & -0.3536 + 0.3536j & 0.3536 - 0.3536j & -0.3536 + 0.3536j \\ 0.1913 - 0.4619j & -0.4619 - 0.1913 & -0.1913 + 0.4619j & 0.4619 + 0.1913j \end{matrix}$$

$$\text{codebook}(:,:,4) = \begin{matrix} 0.5000 & 0.5000 & 0.5000 & 0.5000 + 0.0000j \\ 0.4976 + 0.0490j & -0.0490 + 0.4976j & -0.4976 - 0.0490j & 0.0490 - 0.4976j \\ 0.4904 + 0.0975j & -0.4904 - 0.0975j & 0.4904 + 0.0975j & -0.4904 - 0.0975j \\ 0.4785 + 0.1451j & 0.1451 - 0.4785j & -0.4785 - 0.1451j & -0.1451 + 0.4785j \end{matrix}$$

-continued $$\text{codebook}(:,:,5) = \begin{pmatrix} 0.5000 & 0.5000 & 0.5000 + 0.0000j & 0.5000 - 0.0000j \\ 0.4976 - 0.0490j & 0.0490 + 0.4976j & -0.4976 + 0.0490j & -0.0490 - 0.4976j \\ 0.4904 - 0.0975j & -0.4904 + 0.0975j & 0.4904 - 0.0975j & -0.4904 + 0.0975j \\ 0.4785 - 0.1451j & -0.1451 - 0.4785j & -0.4785 + 0.1451j & 0.1451 + 0.4785j \end{pmatrix}$$

$$\text{codebook}(:,:,6) = \begin{pmatrix} 0.5000 & 0.5000 & 0.5000 & 0.5000 \\ 0.3536 + 0.3536j & -0.3536 + 0.3536j & -0.3536 - 0.3536j & 0.3536 - 0.3536j \\ 0.5000 & -0.5000 & 0.5000 & -0.5000 \\ 0.3536 + 0.3536j & 0.3536 - 0.3536j & -0.3536 - 0.3536j & -0.3536 + 0.3536j \end{pmatrix}$$

$$\text{codebook}(:,:,7) = \begin{pmatrix} 0.5000 & 0.5000 & 0.5000 & 0.5000 \\ 0.3536 - 0.3536j & 0.3536 + 0.3536j & -0.3536 + 0.3536j & -0.3536 - 0.3536j \\ 0.5000 & -0.5000 & 0.5000 & -0.5000 \\ 0.3536 - 0.3536j & -0.3536 - 0.3536j & -0.3536 + 0.3536j & 0.3536 + 0.3536j \end{pmatrix}$$

$$\text{codebook}(:,:,8) = \begin{pmatrix} 0.5000 & 0.5000 & 0.5000 & 0.5000 \\ 0.3536 + 0.3536j & -0.3536 + 0.3536j & -0.3536 - 0.3536j & 0.3536 - 0.3536j \\ 0.5000 & -0.5000 & 0.5000 & -0.5000 \\ 0.3536 - 0.3536j & -0.3536 - 0.3536j & -0.3536 + 0.3536j & 0.3536 + 0.3536j \end{pmatrix}$$

$$\text{codebook}(:,:,9) = \begin{pmatrix} 0.5000 & 0.5000 & 0.5000 & 0.5000 \\ 0.3536 - 0.3536j & 0.3536 + 0.3536j & -0.3536 + 0.3536 & -0.3536 - 0.3536j \\ 0.5000 & -0.5000 & 0.5000 & -0.5000 \\ 0.3536 + 0.3536j & 0.3536 - 0.3536j & -0.3536 - 0.3536j & -0.3536 + 0.3536j \end{pmatrix}$$

$$\text{codebook}(:,:,10) = \begin{pmatrix} 0.5000 & 0.5000 & 0.5000 & 0.5000 - 0.0000j \\ 0.4619 + 0.1913j & -0.1913 + 0.4619j & -0.4619 - 0.1913j & 0.1913 - 0.4619j \\ 0.5000 & -0.5000 & 0.5000 & -0.5000 + 0.0000j \\ 0.4619 + 0.1913j & 0.1913 - 0.4619j & -0.4619 - 0.1913j & -0.1913 + 0.4619j \end{pmatrix}$$

$$\text{codebook}(:,:,11) = \begin{pmatrix} 0.5000 & 0.5000 & 0.5000 & 0.5000 + 0.0000j \\ 0.4619 - 0.1913j & 0.1913 + 0.4619j & -0.4619 + 0.1913j & -0.1913 - 0.4619j \\ 0.5000 & -0.5000 & 0.5000 & -0.5000 - 0.0000j \\ 0.4619 - 0.1913j & -0.1913 - 0.4619j & -0.4619 + 0.1913j & 0.1913 + 0.4619j \end{pmatrix}$$

$$\text{codebook}(:,:,12) = \begin{pmatrix} 0.5000 & 0.5000 - 0.0000j & 0.5000 - 0.0000j & 0.5000 + 0.0000j \\ 0.5000 & -0.0000 + 0.5000j & -0.5000 + 0.0000j & -0.0000 - 0.5000j \\ 0.3536 + 0.3536j & -0.3536 - 0.3536j & 0.3536 + 0.3536j & -0.3536 - 0.3536j \\ 0.3536 + 0.3536j & 0.3536 - 0.3536j & -0.3536 - 0.3536j & -0.3536 + 0.3536j \end{pmatrix}$$

$$\text{codebook}(:,:,13) = \begin{pmatrix} 0.5000 & 0.5000 - 0.0000j & 0.5000 + 0.0000j & 0.50000 + 0.0000j \\ 0.5000 & -0.0000 + 0.5000j & -0.5000 - 0.0000j & -0.0000 - 0.5000j \\ 0.3536 - 0.3536j & -0.3536 + 0.3536j & 0.3536 - 0.3536j & -0.3536 + 0.3536j \\ 0.3536 - 0.3536j & -0.3536 - 0.3536j & -0.3536 + 0.3536j & 0.3536 + 0.3536j \end{pmatrix}$$

$$\text{codebook}(:,:,14) = \begin{pmatrix} 0.5000 & 0.5000 - 0.0000j & 0.5000 & 0.5000 + 0.0000j \\ 0.5000 & -0.0000 + 0.5000j & -0.5000 & -0.0000 - 0.5000j \\ 0.3536 + 0.3536j & -0.3536 - 0.3536j & 0.3536 + 0.3536j & -0.3536 - 0.3536j \\ 0.3536 - 0.3536j & -0.3536 - 0.3536j & -0.3536 + 0.3536j & 0.3536 + 0.3536j \end{pmatrix}$$

$$\text{codebook}(:,:,15) = \begin{pmatrix} 0.5000 & 0.5000 - 0.0000j & 0.5000 + 0.0000j & 0.5000 - 0.0000j \\ 0.5000 & 0 + 0.5000j & -0.5000 - 0.0000j & -0.0000 - 0.5000j \\ 0.4619 + 0.1913j & -0.4619 - 0.1913 & 0.4619 + 0.1913j & -0.4619 - 0.1913j \\ 0.4619 + 0.1913j & 0.1913 - 0.4619j & -0.4619 - 0.1913j & -0.1913 + 0.4619j \end{pmatrix}$$

$$\text{codebook}(:,:,16) = \begin{pmatrix} 0.5000 & 0.5000 & 0.5000 - 0.0000j & 0.5000 + 0.0000j \\ 0.5000 & -0.0000 + 0.5000j & -0.5000 + 0.0000j & 0.0000 - 0.5000j \\ 0.4619 - 0.1913j & -0.4619 + 0.1913j & 0.4619 - 0.1913j & -0.4619 + 0.1913j \\ 0.4619 - 0.1913j & -0.1913 - 0.4619j & -0.4619 + 0.1913j & 0.1913 + 0.4619j \end{pmatrix}$$

Codebook Set 3:

1 basis codeword

4 DFT codewords with π/8 and π/16

6 approach 1 codewords with π/4 and π/16

5 approach 2 codewords with π/4 and π/16

$$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000 & 0.5000 & 0.5000+0.0000j \\ 0.4904+0.0975j & -0.0975+0.4904j & -0.4904-0.0975j & 0.0975-0.4904j \\ 0.4619+0.1913j & -0.4619-0.1913j & 0.4619+0.1913j & -0.4619-0.1913j \\ 0.4157+0.2778j & 0.2778-0.4157j & -0.4157-0.2778j & -0.2778+0.4157j \end{matrix}$$

$$\text{codebook}(:,:,5) = \begin{matrix} 0.5000 & 0.5000 & 0.5000+0.0000j & 0.5000-0.0000j \\ 0.4904-0.0975j & 0.0975+0.4904j & -0.4904+0.0975j & -0.0975-0.4904j \\ 0.4619-0.1913j & -0.4619+0.1913j & 0.4619-0.1913j & -0.4619+0.1913j \\ 0.4157-0.2778j & -0.2778-0.4157j & -0.4157+0.2778j & 0.2778+0.4157j \end{matrix}$$

$$\text{codebook}(:,:,6) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000 & 0.5000 & 0.5000 \\ 0.4904+0.0975j & -0.0975+0.4904j & -0.4904-0.0975j & 0.0975-0.4904j \\ 0.5000 & -0.5000 & 0.5000 & -0.5000 \\ 0.4904+0.0975j & 0.0975-0.4904j & -0.4904-0.0975j & -0.0975j+0.4904j \end{matrix}$$

$$\text{codebook}(:,:,11) = \begin{matrix} 0.5000 & 0.5000 & 0.5000 & 0.5000 \\ 0.4904-0.0975j & 0.0975+0.4904j & -0.4904+0.0975j & -0.0975-0.4904j \\ 0.5000 & -0.5000 & 0.5000 & -0.5000 \\ 0.4904-0.0975j & -0.0975-0.4904j & -0.4904+0.0975j & 0.0975j+0.4904j \end{matrix}$$

$$codebook(:,:,12) = \begin{matrix} 0.5000 & 0.5000 - 0.0000j & 0.5000 + 0.0000j & 0.5000 + 0.000j \\ 0.5000 & -0.0000 + 0.5000j & -0.5000 + 0.0000j & -0.0000 - 0.5000j \\ 0.3536 + 0.3536j & -0.3536 - 0.3536j & 0.3536 + 0.3536j & -0.3536 - 0.3536j \\ 0.3536 + 0.3536j & 0.3536 - 0.3536j & -0.3536 - 0.3536j & -0.3536 + 0.3536j \end{matrix}$$

$$codebook(:,:,13) = \begin{matrix} 0.5000 & 0.5000 - 0.0000j & 0.5000 + 0.0000j & 0.5000 + 0.000j \\ 0.5000 & -0.0000 + 0.5000j & -0.5000 - 0.0000j & -0.0000 - 0.5000j \\ 0.3536 - 0.3536j & -0.3536 + 0.3536j & 0.3536 - 0.3536j & -0.3536 + 0.3536j \\ 0.3536 - 0.3536j & -0.3536 - 0.3536j & -0.3536 + 0.3536j & 0.3536 + 0.3536j \end{matrix}$$

$$codebook(:,:,14) = \begin{matrix} 0.5000 & 0.5000 - 0.0000j & 0.5000 & 0.5000 + 0.000j \\ 0.5000 & -0.0000 + 0.5000j & -0.5000 & -0.0000 - 0.5000j \\ 0.3536 + 0.3536j & -0.3536 - 0.3536j & 0.3536 + 0.3536j & -0.3536 - 0.3536j \\ 0.3536 - 0.3536j & -0.3536 - 0.3536j & -0.3536 + 0.3536j & 0.3536 + 0.3536j \end{matrix}$$

$$codebook(:,:,15) = \begin{matrix} 0.5000 & 0.5000 & 0.5000 & 0.5000 \\ 0.5000 & 0 + 0.5000j & -0.5000 & 0 - 0.5000j \\ 0.4904 + 0.0975j & -0.4904 - 0.0975j & 0.4904 + 0.0975j & -0.4904 - 0.0975j \\ 0.4904 + 0.0975j & 0.0975 - 0.4904j & -0.4904 - 0.0975j & -0.0975 + 0.4904j \end{matrix}$$

$$codebook(:,:,16) = \begin{matrix} 0.5000 & 0.5000 & 0.5000 & 0.5000 \\ 0.5000 & 0 + 0.5000j & -0.5000 & 0 - 0.5000j \\ 0.4904 - 0.0975j & -0.4904 + 0.0975j & 0.4904 - 0.0975j & -0.4904 + 0.0975j \\ 0.4904 - 0.0975j & -0.0975 - 0.4904j & -0.4904 + 0.0975j & 0.0975 + 0.4904j \end{matrix}$$

Codebook Set 4:

1 basis codeword

4 DFT codewords with $\pi/8$ and $\pi/32$ 6 approach 1 codewords with $\pi/4$ and $\pi/16$ 5 approach 2 codewords with $\pi/4$ and $\pi/16$ $$codebook(:,:,1) = \begin{matrix} 0.5000 & 0.5000 & 0.5000 & 0.5000 \\ 0.5000 & 0 + 0.5000j & -0.5000 & 0 - 0.5000j \\ 0.5000 & -0.5000 & 0.5000 & -0.5000 \\ 0.5000 & 0 - 0.5000j & -0.5000 & 0 + 0.5000j \end{matrix}$$

$$codebook(:,:,2) = \begin{matrix} 0.5000 & 0.5000 & 0.5000 & 0.5000 \\ 0.4619 + 0.1913j & -0.1913 + 0.4619j & -0.4619 - 0.1913j & 0.1913 - 0.4619j \\ 0.3536 + 0.3536j & -0.3536 - 0.3536j & 0.3536 + 0.3536j & -0.3536 - 0.3536j \\ 0.1913 + 0.4619j & 0.4619 - 0.1913j & -0.1913 - 0.4619j & -0.4619 + 0.1913j \end{matrix}$$

$$codebook(:,:,3) = \begin{matrix} 0.5000 & 0.5000 & 0.5000 & 0.5000 \\ 0.4619 - 0.1913j & 0.1913 + 0.4619j & -0.4619 + 0.1913j & -0.1913 - 0.4619j \\ 0.3536 - 0.3536j & -0.3536 + 0.3536j & 0.3536 - 0.3536j & -0.3536 + 0.3536j \\ 0.1913 - 0.4619j & -0.4619 - 0.1913j & -0.1913 + 0.4619j & 0.4619 + 0.1913j \end{matrix}$$

$$codebook(:,:,4) = \begin{matrix} 0.5000 & 0.5000 - 0.0000j & 0.5000 - 0.0000j & 0.5000 - 0.0000j \\ 0.4976 + 0.0490j & -0.0490 + 0.4976j & -0.4976 - 0.0490j & 0.0490 - 0.4976j \\ 0.4904 + 0.0975j & -0.4904 - 0.0975j & 0.4904 + 0.0975j & -0.4904 - 0.0975j \\ 0.4785 + 0.1451j & 0.1451 - 0.4785j & -0.4785 - 0.1451j & -0.1451 + 0.4785j \end{matrix}$$

$$codebook(:,:,5) = \begin{matrix} 0.5000 & 0.5000 - 0.0000j & 0.5000 - 0.0000j & 0.5000 + 0.0000j \\ 0.4976 - 0.0490j & 0.0490 + 0.4976j & -0.4976 + 0.0490j & -0.0490 - 0.4976j \\ 0.4904 - 0.0975j & -0.4904 + 0.0975j & 0.4904 - 0.0975j & -0.4904 + 0.0975j \\ 0.4785 - 0.1451j & -0.1451 - 0.4785j & -0.4785 + 0.1451j & 0.1451 + 0.4785j \end{matrix}$$

-continued $$\text{codebook}(:,:,6) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000 & 0.5000 & 0.5000 \\ 0.4904+0.0975j & -0.0975+0.4904j & -0.4904-0.0975j & 0.0975-0.4904j \\ 0.5000 & -0.5000 & 0.5000 & -0.5000 \\ 0.4904+0.0975j & 0.0975-0.4904j & -0.4904-0.0975j & -0.0975+0.4904j \end{matrix}$$

$$\text{codebook}(:,:,11) = \begin{matrix} 0.5000 & 0.5000 & 0.5000 & 0.5000 \\ 0.4904-0.0975j & 0.0975+0.4904j & -0.4904+0.0975j & -0.0975-0.4904j \\ 0.5000 & -0.5000 & 0.5000 & -0.5000 \\ 0.4904-0.0975j & -0.0975-0.4904j & -0.4904+0.0975j & 0.0975j+0.4904j \end{matrix}$$

$$\text{codebook}(:,:,12) = \begin{matrix} 0.5000 & 0.5000-0.0000j & 0.5000-0.0000j & 0.5000+0.000j \\ 0.5000 & -0.0000+0.5000j & -0.5000+0.0000j & -0.0000-0.5000j \\ 0.3536+0.3536j & -0.3536-0.3536j & 0.3536+0.3536j & -0.3536-0.3536j \\ 0.3536+0.3536j & 0.3536-0.3536j & -0.3536-0.3536j & -0.3536+0.3536j \end{matrix}$$

$$\text{codebook}(:,:,13) = \begin{matrix} 0.5000 & 0.5000-0.0000j & 0.5000+0.0000j & 0.5000+0.000j \\ 0.5000 & -0.0000+0.5000j & -0.5000-0.0000j & -0.0000-0.5000j \\ 0.3536-0.3536j & -0.3536+0.3536j & 0.3536-0.3536j & -0.3536+0.3536j \\ 0.3536-0.3536j & -0.3536-0.3536j & -0.3536+0.3536j & 0.3536+0.3536j \end{matrix}$$

$$\text{codebook}(:,:,14) = \begin{matrix} 0.5000 & 0.5000-0.0000j & 0.5000 & 0.5000+0.000j \\ 0.5000 & -0.0000+0.5000j & -0.5000 & -0.0000-0.5000j \\ 0.3536+0.3536j & -0.3536-0.3536j & 0.3536+0.3536j & -0.3536-0.3536j \\ 0.3536-0.3536j & -0.3536-0.3536j & -0.3536+0.3536j & 0.3536+0.3536j \end{matrix}$$

$$\text{codebook}(:,:,15) = \begin{matrix} 0.5000 & 0.5000 & 0.5000 & 0.5000 \\ 0.5000 & 0+0.5000j & -0.5000 & 0-0.5000j \\ 0.4904+0.0975j & -0.4904-0.0975j & 0.4904+0.0975j & -0.4904-0.0975j \\ 0.4904+0.0975j & 0.0975-0.4904j & -0.4904-0.0975j & -0.0975+0.4904j \end{matrix}$$

$$\text{codebook}(:,:,16) = \begin{matrix} 0.5000 & 0.5000 & 0.5000 & 0.5000 \\ 0.5000 & 0+0.5000j & -0.5000 & 0-0.5000j \\ 0.4904-0.0975j & -0.4904+0.0975j & 0.4904-0.0975j & -0.4904+0.0975j \\ 0.4904-0.0975j & -0.0975-0.4904j & -0.4904+0.0975j & 0.0975+0.4904j \end{matrix}$$

Codebook Set 5:

1 basis codeword

4 DFT codewords with π/8 and π/16

8 approach 1 codewords with π/4 and π/8

3 approach 2 codewords with π/4 and π/8

$$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000 & 0.5000 & 0.5000+0.0000j \\ 0.4904+0.0975j & -0.0975+0.4904j & -0.4904-0.0975j & 0.0975-0.4904j \\ 0.4619+0.1913j & -0.4619-0.1913j & 0.4619+0.1913j & -0.4619-0.1913j \\ 0.4157+0.2778j & 0.2778-0.4157j & -0.4157-0.2778j & -0.2778+0.4157j \end{matrix}$$

$$\text{codebook}(:,:,5) = \begin{matrix} 0.5000 & 0.5000 & 0.5000+0.0000j & 0.5000-0.0000j \\ 0.4904-0.0975j & 0.0975+0.4904j & -0.4904+0.0975j & -0.0975-0.4904j \\ 0.4619-0.1913j & -0.4619+0.1913j & 0.4619-0.1913j & -0.4619+0.1913j \\ 0.4157-0.2778j & -0.2778-0.4157j & -0.4157+0.2778j & 0.2778+0.4157j \end{matrix}$$

$$\text{codebook}(:,:,6) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000 & 0.5000 & 0.5000-0.0000j \\ 0.4619+0.1913j & -0.1913+0.4619j & -0.4619-0.1913j & 0.1913-0.4619j \\ 0.5000 & -0.5000 & 0.5000 & -0.5000+0.0000j \\ 0.4619+0.1913j & 0.1913-0.4619j & -0.4619-0.1913j & -0.1913j+0.4619j \end{matrix}$$

$$\text{codebook}(:,:,11) = \begin{matrix} 0.5000 & 0.5000 & 0.5000 & 0.5000+0.0000j \\ 0.4619-0.1913j & 0.1913+0.4619j & -0.4619+0.1913j & -0.1913-0.4619j \\ 0.5000 & -0.5000 & 0.5000 & -0.5000-0.0000j \\ 0.4619-0.1913j & -0.1913-0.4619j & -0.4619+0.1913j & 0.1913j+0.4619j \end{matrix}$$

-continued $$\text{codebook}(:,:,12) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.5000 & -0.5000 & 0.5000 & -0.5000 \\ 0.4619-0.1913j & -0.1913-0.4619j & -0.4619+0.1913j & -0.1913+0.4619j \end{matrix}$$

$$\text{codebook}(:,:,13) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.5000 & -0.5000 & 0.5000 & -0.5000 \\ 0.4619+0.1913j & 0.1913-0.4619j & -0.4619-0.1913j & -0.1913+0.4619j \end{matrix}$$

$$\text{codebook}(:,:,14) = \begin{matrix} 0.5000 & 0.5000-0.0000j & 0.5000-0.0000j & 0.5000+0.000j \\ 0.5000 & -0.0000+0.5000j & -0.5000+0.0000j & -0.0000-0.5000j \\ 0.3536+0.3536j & -0.3536-0.3536j & 0.3536+0.3536j & -0.3536-0.3536j \\ 0.3536+0.3536j & 0.3536-0.3536j & -0.3536-0.3536j & -0.3536+0.3536j \end{matrix}$$

$$\text{codebook}(:,:,15) = \begin{matrix} 0.5000 & 0.5000-0.0000j & 0.5000+0.0000j & 0.5000+0.000j \\ 0.5000 & -0.0000+0.5000j & -0.5000-0.0000j & -0.0000-0.5000j \\ 0.3536-0.3536j & -0.3536+0.3536j & 0.3536+0.3536j & -0.3536+0.3536j \\ 0.3536-0.3536j & -0.3536-0.3536j & -0.3536+0.3536j & 0.3536+0.3536j \end{matrix}$$

$$\text{codebook}(:,:,16) = \begin{matrix} 0.5000 & 0.5000-0.0000j & 0.5000+0.0000j & 0.5000-0.0000j \\ 0.5000 & 0+0.5000j & -0.5000-0.0000j & -0.0000-0.5000j \\ 0.4619+0.1913j & -0.4619-0.1913j & 0.4619+0.1913j & -0.4619-0.1913j \\ 0.4619+0.1913j & 0.1913-0.4619j & -0.4619-0.1913j & -0.1913+0.4619j \end{matrix}$$

Codebook Set 6:

1 basis codeword

4 DFT codewords with $\pi/8$ and $\pi/32$ 8 approach 1 codewords with $\pi/4$ and $\pi/8$ 3 approach 2 codewords with $\pi/4$ and $\pi/8$ $$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000-0.0000j & 0.5000-0.0000j & 0.5000+0.0000j \\ 0.4904+0.0975j & -0.0975+0.4904j & -0.4904-0.0975j & 0.0975-0.4904j \\ 0.4904+0.0975j & -0.4904-0.0975j & 0.4904+0.0975j & -0.4904-0.0975j \\ 0.4785+0.1451j & 0.1451-0.4785j & -0.4785-0.1451j & -0.1451+0.4785j \end{matrix}$$

$$\text{codebook}(:,:,5) = \begin{matrix} 0.5000 & 0.5000-0.0000j & 0.5000-0.0000j & 0.5000-0.0000j \\ 0.4904-0.0975j & 0.0975+0.4904j & -0.4904+0.0975j & -0.0975-0.4904j \\ 0.4904-0.0975j & -0.4904+0.0975j & 0.4904-0.0975j & -0.4904+0.0975j \\ 0.4785-0.1451j & -0.1451-0.4785j & -0.4785+0.1451j & 0.1451+0.4785j \end{matrix}$$

-continued $$\text{codebook}(:,:,6) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000 & 0.5000 & 0.5000-0.0000j \\ 0.4619+0.1913j & -0.1913+0.4619j & -0.4619-0.1913j & 0.1913-0.4619j \\ 0.5000 & -0.5000 & 0.5000 & -0.5000+0.0000j \\ 0.4619+0.1913j & 0.1913-0.4619j & -0.4619-0.1913j & -0.1913+0.4619j \end{matrix}$$

$$\text{codebook}(:,:,11) = \begin{matrix} 0.5000 & 0.5000 & 0.5000 & 0.5000+0.0000j \\ 0.4619-0.1913j & 0.1913+0.4619j & -0.4619+0.1913j & -0.1913-0.4619j \\ 0.5000 & -0.5000 & 0.5000 & -0.5000-0.0000j \\ 0.4619-0.1913j & -0.1913-0.4619j & -0.4619+0.1913j & 0.1913j+0.4619j \end{matrix}$$

$$\text{codebook}(:,:,12) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.5000 & -0.5000 & 0.5000 & -0.5000 \\ 0.4619-0.1913j & -0.1913-0.4619j & -0.4619+0.1913j & 0.1913+0.4619j \end{matrix}$$

$$\text{codebook}(:,:,13) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.5000 & -0.5000 & 0.5000 & -0.5000 \\ 0.4619+0.1913j & 0.1913-0.4619j & -0.4619-0.1913j & -0.1913+0.4619j \end{matrix}$$

$$\text{codebook}(:,:,14) = \begin{matrix} 0.5000 & 0.5000-0.0000j & 0.5000-0.0000j & 0.5000+0.000j \\ 0.5000 & -0.0000+0.5000j & -0.5000+0.0000j & -0.0000-0.5000j \\ 0.3536+0.3536j & -0.3536-0.3536j & 0.3536+0.3536j & -0.3536-0.3536j \\ 0.3536+0.3536j & 0.3536-0.3536j & -0.3536-0.3536j & -0.3536+0.3536j \end{matrix}$$

$$\text{codebook}(:,:,15) = \begin{matrix} 0.5000 & 0.5000-0.0000j & 0.5000+0.0000j & 0.5000+0.000j \\ 0.5000 & -0.0000+0.5000j & -0.5000-0.0000j & -0.0000-0.5000j \\ 0.3536-0.3536j & -0.3536+0.3536j & 0.3536-0.3536j & -0.3536+0.3536j \\ 0.3536-0.3536j & -0.3536-0.3536j & -0.3536+0.3536j & 0.3536+0.3536j \end{matrix}$$

$$\text{codebook}(:,:,16) = \begin{matrix} 0.5000 & 0.5000-0.0000j & 0.5000+0.0000j & 0.5000-0.0000j \\ 0.5000 & 0+0.5000j & -0.5000-0.0000j & -0.0000-0.5000j \\ 0.4619+0.1913j & -0.4619-0.1913j & 0.4619+0.1913j & -0.4619-0.1913j \\ 0.4619+0.1913j & 0.1913-0.4619j & -0.4619-0.1913j & -0.1913+0.4619j \end{matrix}$$

Codebook Set 7:

1 basis codeword

4 DFT codewords with $\pi/8$ and $\pi/16$ 8 approach 2 codewords with $\pi/4$ and $\pi/8$ 3 approach 1 codewords with $\pi/4$ and $\pi/8$ $$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000 & 0.5000 & 0.5000+0.0000j \\ 0.4904+0.0975j & -0.0975+0.4904j & -0.4904-0.0975j & 0.0975-0.4904j \\ 0.4619+0.1913j & -0.4619-0.1913j & 0.4619+0.1913j & -0.4619-0.1913j \\ 0.4157+0.2778j & 0.2778-0.4157j & -0.4157-0.2778j & -0.2778+0.4157j \end{matrix}$$

$$\text{codebook}(:,:,5) = \begin{matrix} 0.5000 & 0.5000 & 0.5000+0.0000j & 0.5000-0.0000j \\ 0.4904-0.0975j & 0.0975+0.4904j & -0.4904+0.0975j & -0.0975-0.4904j \\ 0.4619-0.1913j & -0.4619+0.1913j & 0.4619-0.1913j & -0.4619+0.1913j \\ 0.4157-0.2778j & -0.2778-0.4157j & -0.4157+0.2778j & 0.2778+0.4157j \end{matrix}$$

$$\text{codebook}(:,:,6) = \begin{matrix} 0.5000 & 0.5000-0.0000j & 0.5000-0.0000j & 0.5000+0.0000j \\ 0.5000 & -0.0000+0.5000j & -0.5000+0.0000j & -0.0000-0.5000j \\ 0.3536+0.3536j & -0.3536-0.3536j & 0.3536+0.3536j & -0.3536-0.3536j \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000-0.0000j & 0.5000+0.0000j & 0.5000+0.0000j \\ 0.5000 & -0.0000+0.5000j & -0.5000-0.0000j & -0.0000-0.5000j \\ 0.3536-0.3536j & -0.3536+0.3536j & 0.3536-0.3536j & -0.3536+0.3536j \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000-0.0000j & 0.5000 & 0.5000+0.0000j \\ 0.5000 & -0.0000+0.5000j & -0.5000 & 0.0000-0.5000j \\ 0.3536+0.3536j & -0.3536-0.3536j & 0.3536+0.3536j & -0.3536-0.3536j \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000-0.0000j & 0.5000-0.0000j & 0.5000-0.0000j \\ 0.5000 & -0.0000+0.5000j & -0.5000-0.0000j & 0.0000-0.5000j \\ 0.3536-0.3536j & -0.3536+0.3536j & 0.3536-0.3536j & -0.3536+0.3536j \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000-0.0000j & 0.5000+0.0000j & 0.5000-0.0000j \\ 0.5000 & 0+0.5000j & -0.5000-0.0000j & -0.0000-0.5000j \\ 0.4619+0.1913j & -0.4619-0.1913j & 0.4619+0.1913j & -0.4619-0.1913j \\ 0.4619+0.1913j & 0.1913-0.4619j & -0.4619-0.1913j & -0.1913+0.4619j \end{matrix}$$

$$\text{codebook}(:,:,11) = \begin{matrix} 0.5000 & 0.5000 & 0.5000-0.0000j & 0.5000+0.0000j \\ 0.5000 & -0.0000+0.5000j & -0.5000+0.0000j & 0.0000-0.5000j \\ 0.4619-0.1913j & -0.4619+0.1913j & 0.4619-0.1913j & -0.4619+0.1913j \\ 0.4619-0.1913j & -0.1913-0.4619j & -0.4619+0.1913j & 0.1913+0.4619j \end{matrix}$$

-continued $$\text{codebook}(:,:,12) = \begin{matrix} 0.5000 & 0.5000-0.0000j & 0.5000 & 0.5000-0.0000j \\ 0.5000 & -0.0000+0.5000j & -0.5000 & 0.0000-0.5000j \\ 0.4619+0.1913j & -0.4619-0.1913j & 0.4619+0.1913j & -0.4619-0.1913j \\ 0.4619-0.1913j & -0.1913-0.4619j & -0.4619+0.1913j & 0.1913+0.4619j \end{matrix}$$

$$\text{codebook}(:,:,13) = \begin{matrix} 0.5000 & 0.5000 & 0.5000-0.0000j & 0.5000+0.0000j \\ 0.5000 & 0+0.5000j & -0.5000-0.0000j & -0.0000-0.5000j \\ 0.4619-0.1913j & -0.4619+0.1913j & 0.4619-0.1913j & -0.4619+0.1913j \\ 0.4619+0.1913j & 0.1913-0.4619j & -0.4619-0.1913j & -0.1913+0.4619j \end{matrix}$$

$$\text{codebook}(:,:,14) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,15) = \begin{matrix} 0.5000 & 0.5000 & 0.5000 & 0.5000 \\ 0.3536-0.3536j & -0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,16) = \begin{matrix} 0.5000 & 0.5000 & 0.5000 & 0.5000-0.0000j \\ 0.4619+0.1913j & -0.1913+0.4619j & -0.4619-0.1913j & -0.1913-0.4619j \\ 0.5000 & -0.5000 & 0.5000 & -0.5000+0.0000j \\ 0.4619+0.1913j & 0.1913-0.4619j & -0.4619-0.1913j & -0.1913+0.4619j \end{matrix}$$

Codebook Set 8:

1 basis codeword

4 DFT codewords with $\pi/8$ and $\pi/32$ 8 approach 2 codewords with $\pi/4$ and $\pi/8$ 3 approach 1 codewords with $\pi/4$ and $\pi/8$ $$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000-0.0000j & 0.5000-0.0000j & 0.5000-0.0000j \\ 0.4976+0.0490j & -0.0490+0.4976j & -0.4976-0.0490j & 0.0490-0.4976j \\ 0.4904+0.0975j & -0.4904-0.0975j & 0.4904+0.0975j & -0.4904-0.0975j \\ 0.4785+0.1451j & 0.1451-0.4785j & -0.4785-0.1451j & -0.1451+0.4785j \end{matrix}$$

$$\text{codebook}(:,:,5) = \begin{matrix} 0.5000 & 0.5000-0.0000j & 0.5000-0.0000j & 0.5000+0.0000j \\ 0.4976-0.0490j & 0.0490+0.4976j & -0.4976+0.0490j & -0.0490-0.4976j \\ 0.4904-0.0975j & -0.4904+0.0975j & 0.4904-0.0975j & -0.4904+0.0975j \\ 0.4785-0.1451j & -0.1451-0.4785j & -0.4785+0.1451j & 0.1451+0.4785j \end{matrix}$$

-continued $$\text{codebook}(:,:,6) = \begin{matrix} 0.5000 & 0.5000 - 0.0000j & 0.5000 - 0.0000j & 0.5000 - 0.0000j \\ 0.5000 & -0.0000 + 0.5000j & -0.5000 - 0.0000j & -0.0000 - 0.5000j \\ 0.3536 + 0.3536j & -0.3536 - 0.3536j & 0.3536 + 0.3536j & -0.3536 - 0.3536j \\ 0.3536 + 0.3536j & 0.3536 - 0.3536j & -0.3536 - 0.3536j & -0.3536 + 0.3536j \end{matrix}$$

$$\text{codebook}(:,:,7) = \begin{matrix} 0.5000 & 0.5000 - 0.0000j & 0.5000 + 0.0000j & 0.5000 + 0.0000j \\ 0.5000 & -0.0000 + 0.5000j & -0.5000 - 0.0000j & -0.0000 - 0.5000j \\ 0.3536 - 0.3536j & -0.3536 + 0.3536j & 0.3536 - 0.3536j & -0.3536 + 0.3536j \\ 0.3536 - 0.3536j & -0.3536 - 0.3536j & -0.3536 + 0.3536j & 0.3536 + 0.3536j \end{matrix}$$

$$\text{codebook}(:,:,8) = \begin{matrix} 0.5000 & 0.5000 - 0.0000j & 0.5000 & 0.5000 + 0.0000j \\ 0.5000 & -0.0000 + 0.5000j & -0.5000 & 0.0000 - 0.5000j \\ 0.3536 + 0.3536j & -0.3536 - 0.3536j & 0.3536 + 0.3536j & -0.3536 - 0.3536j \\ 0.3536 - 0.3536j & -0.3536 - 0.3536j & -0.3536 + 0.3536j & 0.3536 + 0.3536j \end{matrix}$$

$$\text{codebook}(:,:,9) = \begin{matrix} 0.5000 & 0.5000 - 0.0000j & 0.5000 - 0.0000j & 0.5000 - 0.0000j \\ 0.5000 & -0.0000 + 0.5000j & -0.5000 - 0.0000j & 0.0000 - 0.5000j \\ 0.3536 - 0.3536j & -0.3536 + 0.3536j & 0.3536 - 0.3536j & -0.3536 + 0.3536j \\ 0.3536 + 0.3536j & 0.3536 - 0.3536j & -0.3536 - 0.3536j & -0.3536 + 0.3536j \end{matrix}$$

$$\text{codebook}(:,:,10) = \begin{matrix} 0.5000 & 0.5000 - 0.000j & 0.5000 + 0.000j & 0.5000 - 0.0000j \\ 0.5000 & 0 + 0.5000j & -0.5000 - 0.0000j & -0.0000 - 0.5000j \\ 0.4619 + 0.1913j & -0.4619 - 0.1913j & 0.4619 + 0.1913j & -0.4619 - 0.1913j \\ 0.4619 + 0.1913j & 0.1913 - 0.4619j & -0.4619 - 0.1913j & -0.1913j + 0.4619j \end{matrix}$$

$$\text{codebook}(:,:,11) = \begin{matrix} 0.5000 & 0.5000 & 0.5000 - 0.0000j & 0.5000 + 0.0000j \\ 0.5000 & -0.0000 + 0.5000j & -0.5000 + 0.0000j & 0.0000 - 0.5000j \\ 0.4619 - 0.1913j & -0.4619 + 0.1913j & 0.4619 - 0.1913j & -0.4619 + 0.1913j \\ 0.4619 - 0.1913j & -0.1913 - 0.4619j & -0.4619 + 0.1913j & 0.1913 + 0.4619j \end{matrix}$$

$$\text{codebook}(:,:,12) = \begin{matrix} 0.5000 & 0.5000 - 0.0000j & 0.5000 & 0.5000 - 0.0000j \\ 0.5000 & -0.0000 + 0.5000j & -0.5000 & 0.0000 - 0.5000j \\ 0.4619 + 0.1913j & -0.4619 - 0.1913j & 0.4619 + 0.1913j & -0.4619 - 0.1913j \\ 0.4619 - 0.1913j & -0.1913 - 0.4619j & -0.4619 + 0.1913j & 0.1913 + 0.4619j \end{matrix}$$

$$\text{codebook}(:,:,13) = \begin{matrix} 0.5000 & 0.5000 & 0.5000 - 0.0000j & 0.5000 + 0.0000j \\ 0.5000 & 0 + 0.5000j & -0.5000 - 0.0000j & -0.0000 - 0.5000j \\ 0.4619 - 0.1913j & -0.4619 + 0.1913j & 0.4619 - 0.1913j & -0.4619 + 0.1913j \\ 0.4619 + 0.1913j & 0.1913 - 0.4619j & -0.4619 - 0.1913j & -0.1913 + 0.4619j \end{matrix}$$

$$\text{codebook}(:,:,14) = \begin{matrix} 0.5000 & 0.5000 & 0.5000 & 0.5000 \\ 0.3536 + 0.3536j & -0.3536 + 0.3536j & -0.3536 - 0.3536j & -0.3536 - 0.3536j \\ 0.5000 & -0.5000 & 0.5000 & -0.5000 \\ 0.3536 + 0.3536j & 0.3536 - 0.3536j & -0.3536 - 0.3536j & -0.3536 + 0.3536j \end{matrix}$$

$$\text{codebook}(:,:,15) = \begin{matrix} 0.5000 & 0.5000 & 0.5000 & 0.5000 \\ 0.3536 - 0.3536j & 0.3536 + 0.3536j & -0.3536 + 0.3536j & -0.3536 - 0.3536j \\ 0.5000 & -0.5000 & 0.5000 & -0.5000 \\ 0.3536 - 0.3536j & -0.3536 - 0.3536j & -0.3536 + 0.3536j & 0.3536 + 0.3536j \end{matrix}$$

$$\text{codebook}(:,:,16) = \begin{matrix} 0.5000 & 0.5000 & 0.5000 & 0.5000 - 0.0000j \\ 0.4619 + 0.1913j & -0.1913 + 0.4619j & -0.4619 - 0.1913j & 0.1913 - 0.4619j \\ 0.5000 & -0.5000 & 0.5000 & -0.5000 + 0.0000j \\ 0.4619 + 0.1913j & 0.1913 - 0.4619j & -0.4619 - 0.1913j & -0.1913 + 0.4619j \end{matrix}$$

Codebook Set 9:

1 basis codeword
4 *DFT* codewords with $\pi/8$ and $\pi/16$
8 approach 1 codewords with $\pi/4$ and $\pi/16$
3 approach 2 codewords with $\pi/4$ and $\pi/16$ $$\text{codebook}(:,:,1) = \begin{bmatrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{bmatrix}$$

$$\text{codebook}(:,:,2) = \begin{bmatrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{bmatrix}$$

$$\text{codebook}(:,:,3) = \begin{bmatrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{bmatrix}$$

$$\text{codebook}(:,:,4) = \begin{bmatrix} 0.5000 & 0.5000 & 0.5000 & 0.5000+0.0000j \\ 0.4904+0.0975j & -0.0975+0.4904j & -0.4904-0.0975j & 0.0975-0.4904j \\ 0.4619+0.1913j & -0.4619-0.1913j & 0.4619+0.1913j & -0.4619-0.1913j \\ 0.4157+0.2778j & 0.2778-0.4157j & -0.4157-0.2778j & -0.2778+0.4157j \end{bmatrix}$$

$$\text{codebook}(:,:,5) = \begin{bmatrix} 0.5000 & 0.5000 & 0.5000+0.0000j & 0.5000-0.0000j \\ 0.4904-0.0975j & 0.0975+0.4904j & -0.4904+0.0975j & -0.0975-0.4904j \\ 0.4619-0.1913j & -0.4619+0.1913j & 0.4619-0.1913j & -0.4619+0.1913j \\ 0.4157-0.2778j & -0.2778-0.4157j & -0.4157+0.2778j & 0.2778+0.4157j \end{bmatrix}$$

$$\text{codebook}(:,:,6) = \begin{bmatrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{bmatrix}$$

$$\text{codebook}(:,:,7) = \begin{bmatrix} 0.5000 & 0.5000 & 0.5000 & 0.5000 \\ 0.3536-0.3536j & 0.3536+0.3536j & -0.3536+0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{bmatrix}$$

$$\text{codebook}(:,:,8) = \begin{bmatrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-03536j & -0.3536+0.3536j & 0.3536+0.3536j \end{bmatrix}$$

$$\text{codebook}(:,:,9) = \begin{bmatrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{bmatrix}$$

$$\text{codebook}(:,:,10) = \begin{bmatrix} 0.5000 & 0.5000 & 0.5000 & 0.5000 \\ 0.4904+0.0975j & -0.0975+0.4904j & -0.4904-0.0975j & 0.0975-0.4904j \\ 0.5000 & -0.5000 & 0.5000 & -0.5000 \\ 0.4904+0.0975j & 0.0975-0.4904j & -0.4904-0.0975j & -0.0975+0.4904j \end{bmatrix}$$

-continued $$\text{codebook}(:,:,11) = \begin{matrix} 0.5000 & 0.5000 & 0.5000 & 0.5000 \\ 0.4904 - 0.0975j & 0.0975 + 0.4904j & -0.4904 + 0.0975j & -0.0975 - 0.4904j \\ 0.5000 & -0.5000 & 0.5000 & -0.5000 \\ 0.4904 - 0.0975j & -0.0975 - 0.4904j & -0.4904 + 0.0975j & 0.0975 + 0.4904j \end{matrix}$$

$$\text{codebook}(:,:,12) = \begin{matrix} 0.5000 & 0.5000 & 0.5000 & 0.5000 \\ 0.4904 + 0.0975j & -0.0975 + 0.4904j & -0.4904 - 0.0975j & 0.0975 - 0.4904j \\ 0.5000 & -0.5000 & 0.5000 & -0.5000 \\ 0.4904 - 0.0975j & -0.0975 - 0.4904j & -0.4904 + 0.0975j & 0.0975 + 0.4904j \end{matrix}$$

$$\text{codebook}(:,:,13) = \begin{matrix} 0.5000 & 0.5000 & 0.5000 & 0.5000 \\ 0.4904 - 0.0975j & 0.0975 + 0.4904j & -0.4904 + 0.0975j & -0.0975 - 0.4904j \\ 0.5000 & -0.5000 & 0.5000 & -0.5000 \\ 0.4904 + 0.0975j & 0.0975 - 0.4904j & -0.4904 - 0.0975j & -0.0975 + 0.4904j \end{matrix}$$

$$\text{codebook}(:,:,14) = \begin{matrix} 0.5000 & 0.5000 - 0.0000j & 0.5000 - 0.0000j & 0.5000 + 0.0000j \\ 0.5000 & -0.0000 + 0.5000j & -0.5000 + 0.0000j & -0.0000 - 0.5000j \\ 0.3536 + 0.3536j & -0.3536 - 0.3536j & 0.3536 + 0.3536j & -0.3536 - 0.3536j \\ 0.3536 + 0.3536j & 0.3536 - 0.3536j & -0.3536 - 0.3536j & -0.3536 + 0.3536j \end{matrix}$$

$$\text{codebook}(:,:,15) = \begin{matrix} 0.5000 & 0.5000 - 0.0000j & 0.5000 + 0.0000j & 0.5000 + 0.0000j \\ 0.5000 & -0.0000 + 0.5000j & -0.5000 - 0.0000j & -0.0000 - 0.5000j \\ 0.3536 - 0.3536j & -0.3536 + 0.3536j & 0.3536 - 0.3536j & -0.3536 + 0.3536j \\ 0.3536 - 0.3536j & -0.3536 - 0.3536j & -0.3536 + 0.3536j & 0.3536 + 0.3536j \end{matrix}$$

$$\text{codebook}(:,:,16) = \begin{matrix} 0.5000 & 0.5000 & 0.5000 & 0.5000 \\ 0.5000 & 0 + 0.5000j & -0.5000 & 0 - 0.5000j \\ 0.4904 + 0.0975j & -0.4904 - 0.0975j & 0.4904 + 0.0975j & -0.4904 - 0.0975j \\ 0.4904 + 0.0975j & 0.0975 - 0.4904j & -0.4904 - 0.0975j & -0.0975 + 0.4904j \end{matrix}$$

35

Codebook Set 10:

1 basis codeword
4 DFT codewords with $\pi/8$ and $\pi/32$
8 approach 1 codewords with $\pi/4$ and $\pi/16$
3 approach 2 codewords with $\pi/4$ and $\pi/16$ $$\text{codebook}(:,:,1) = \begin{matrix} 0.5000 & 0.5000 & 0.5000 & 0.5000 \\ 0.5000 & 0 + 0.5000j & -0.5000 & 0 - 0.5000j \\ 0.5000 & -0.5000 & 0.5000 & -0.5000 \\ 0.5000 & 0 - 0.5000j & -0.5000 & 0 + 0.5000j \end{matrix}$$

$$\text{codebook}(:,:,2) = \begin{matrix} 0.5000 & 0.5000 & 0.5000 & 0.5000 \\ 0.4619 + 0.1913j & -0.1913 + 0.4619j & -0.4619 - 0.1913j & 0.1913 - 0.4619j \\ 0.3536 + 0.3536j & -0.3536 - 0.3536j & 0.3536 + 0.3536j & -0.3536 - 0.3536j \\ 0.1913 + 0.4619j & 0.4619 - 0.1913j & -0.1913 - 0.4619j & -0.4619 + 0.1913j \end{matrix}$$

$$\text{codebook}(:,:,3) = \begin{matrix} 0.5000 & 0.5000 & 0.5000 & 0.5000 \\ 0.4619 - 0.1913j & 0.1913 + 0.4619j & -0.4619 + 0.1913j & -0.1913 - 0.4619j \\ 0.3536 - 0.3536j & -0.3536 + 0.3536j & 0.3536 - 0.3536j & -0.3536 + 0.3536j \\ 0.1913 - 0.4619j & -0.4619 - 0.1913j & -0.1913 + 0.4619j & 0.4619 + 0.1913j \end{matrix}$$

$$\text{codebook}(:,:,4) = \begin{matrix} 0.5000 & 0.5000 - 0.0000j & 0.5000 - 0.0000j & 0.5000 - 0.0000j \\ 0.4976 + 0.0490j & -0.0490 + 0.4976j & -0.4976 - 0.0490j & 0.0490 - 0.4976j \\ 0.4904 + 0.0975j & -0.4904 - 0.0975j & 0.4904 + 0.0975j & -0.4904 - 0.0975j \\ 0.4785 + 0.1451j & 0.1451 - 0.4785j & -0.4785 - 0.1451j & -0.1451 + 0.4785j \end{matrix}$$

$$\text{codebook}(:,:,5) = \begin{matrix} 0.5000 & 0.5000-0.0000j & 0.5000-0.0000j & 0.5000+0.0000j \\ 0.4976-0.0490j & 0.0490+0.4976j & -0.4976+0.0490j & -0.0490-0.4976j \\ 0.4904-0.0975j & -0.4904+0.975j & 0.4904-0.0975j & -0.4904+0.0975j \\ 0.4785-0.1451j & -0.1451-0.4785j & -0.4785+0.1451j & 0.1451+0.4785j \end{matrix}$$

$$\text{codebook}(:,:,6) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & 0.5000 & -0.5000 \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & 0.5000 & -0.5000 \\ 0.3536+0.3536j & 0.3536-0.3536j & -0.3536+0.3536j & -0.3536-0.3536j \end{matrix}$$

$$\text{codebook}(:,:,10) = \begin{matrix} 0.5000 & 0.5000 & 0.5000 & 0.5000 \\ 0.4904+0.0975j & -0.0975+0.4904j & -0.4904-0.0975j & 0.0975-0.4904j \\ 0.5000 & -0.5000 & 0.5000 & -0.5000 \\ 0.4904+0.0975j & 0.0975-0.4904j & -0.4904-0.0975j & -0.0975+0.4904j \end{matrix}$$

$$\text{codebook}(:,:,11) = \begin{matrix} 0.5000 & 0.5000 & 0.5000 & 0.5000 \\ 0.4904-0.0975j & 0.0975+0.4904j & -0.4904+0.0975j & 0.0975-0.4904j \\ 0.5000 & -0.5000 & 0.5000 & -0.5000 \\ 0.4904-0.0975j & -0.0975-0.4904j & -0.4904+0.0975j & 0.0975+0.4904j \end{matrix}$$

$$\text{codebook}(:,:,12) = \begin{matrix} 0.5000 & 0.5000 & 0.5000 & 0.5000 \\ 0.4904+0.0975j & -0.0975+0.4904j & -0.4904-0.0975j & 0.0975-0.4904j \\ 0.5000 & -0.5000 & 0.5000 & -0.5000 \\ 0.4904-0.0975j & -0.0975-0.4904j & -0.4904+0.0975j & 0.0975+0.4904j \end{matrix}$$

$$\text{codebook}(:,:,13) = \begin{matrix} 0.5000 & 0.5000 & 0.5000 & 0.5000 \\ 0.4904-0.0975j & 0.0975+0.4904j & -0.4904+0.0975j & -0.0975-0.4904j \\ 0.5000 & -0.5000 & 0.5000 & -0.5000 \\ 0.4904+0.0975j & 0.0975-0.4904j & -0.4904-0.0975j & -0.0975+0.4904j \end{matrix}$$

$$\text{codebook}(:,:,14) = \begin{matrix} 0.5000 & 0.5000-0.0000j & 0.5000-0.0000j & 0.5000+0.0000j \\ 0.5000 & -0.0000+0.5000j & -0.5000+0.0000j & -0.0000-0.5000j \\ 0.3536+0.3536j & -0.3536-0.3536j & 0.3536+0.3536j & -0.3536-0.3536j \\ 0.3536+0.3536j & 0.3536-0.3536j & -0.3536-0.3536j & -0.3536+0.3536j \end{matrix}$$

$$\text{codebook}(:,:,15) = \begin{matrix} 0.5000 & 0.5000-0.0000j & 0.5000+0.0000j & 0.5000+0.0000j \\ 0.5000 & -0.0000+0.5000j & -0.5000-0.0000j & -0.0000-0.5000j \\ 0.3536-0.3536j & -0.3536+0.3536j & 0.3536-0.3536j & -0.3536+0.3536j \\ 0.3536-0.3536j & -0.3536-0.3536j & -0.3536+0.3536j & 0.3536+0.3536j \end{matrix}$$

$$\text{codebook}(:,:,16) = \begin{matrix} 0.5000 & 0.5000 & 0.5000 & 0.5000 \\ 0.5000 & 0+0.5000j & -0.5000 & 0-0.5000j \\ 0.4904+0.0975j & -0.4904-0.0975j & 0.4904+0.0975j & -0.4904-0.0975j \\ 0.4904+0.0975j & 0.0975-0.4904j & -0.4904-0.0975j & -0.0975+0.4904j \end{matrix}$$

Codebook set 11:

1 basis codeword
4 *DFT* codewords with $\pi/8$ and $\pi/16$
8 approach 2 codewords with $\pi/4$ and $\pi/16$
3 approach 1 codewords with $\pi/4$ and $\pi/16$ $$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000 & 0.5000 & 0.5000+0.0000j \\ 0.4904+0.0975j & -0.0975+0.4904j & -0.4904-0.0975j & 0.0975-0.4904j \\ 0.4619+0.1913j & -0.4619-0.1913j & 0.4619+0.1913j & -0.4619-0.1913j \\ 0.4157+0.2778j & 0.2778-0.4157j & -0.4157-0.2778j & -0.2778+0.4157j \end{matrix}$$

$$\text{codebook}(:,:,5) = \begin{matrix} 0.5000 & 0.5000 & 0.5000+0.0000j & 0.5000-0.0000j \\ 0.4904-0.0975j & 0.0975+0.4904j & -0.4904+0.0975j & -0.0975-0.4904j \\ 0.4619-0.1913j & -0.4619+0.1913j & 0.4619-0.1913j & -0.4619+0.1913j \\ 0.4157-0.2778j & -0.2778-0.4157j & -0.4157+0.2778j & 0.2778+0.4157j \end{matrix}$$

$$\text{codebook}(:,:,6) = \begin{matrix} 0.5000 & 0.5000-0.0000j & 0.5000-0.0000j & 0.5000+0.0000j \\ 0.5000 & -0.0000+0.5000j & -0.5000+0.0000j & -0.000-0.5000j \\ 0.3536+0.3536j & -0.3536-0.3536j & 0.3536+0.3536j & -0.3536-0.3536j \\ 0.3536+0.3536j & 0.3536-0.3536j & -0.3536-0.3536j & -0.3536+0.3536j \end{matrix}$$

$$\text{codebook}(:,:,7) = \begin{matrix} 0.5000 & 0.5000-0.0000j & 0.5000+0.0000j & 0.5000+0.0000j \\ 0.5000 & -0.0000+0.5000j & -0.5000-0.0000j & -0.0000-0.5000j \\ 0.3536-0.3536j & -0.3536+0.3536 & 0.3536-0.3536j & -0.3536+0.3536j \\ 0.3536-0.3536j & -0.3536-0.3536j & -0.3536+0.3536j & 0.3536+0.3536j \end{matrix}$$

$$\text{codebook}(:,:,8) = \begin{matrix} 0.5000 & 0.5000-0.0000j & 0.5000 & 0.5000+0.0000j \\ 0.5000 & -0.0000+0.5000j & -0.5000 & -0.0000-0.5000j \\ 0.3536+0.3536j & -0.3536-0.3536j & 0.3536+0.3536j & -0.3536-0.3536j \\ 0.3536-0.3536j & -0.3536-0.3536j & -0.3536+0.3536j & 0.3536+0.3536j \end{matrix}$$

$$\text{codebook}(:,:,9) = \begin{matrix} 0.5000 & 0.5000-0.0000j & 0.5000-0.0000j & 0.5000-0.0000j \\ 0.5000 & -0.0000+0.5000j & -0.5000+0.0000j & 0.0000-0.5000j \\ 0.3536-0.3536j & -0.3536+0.3536 & 0.3536-0.3536j & -0.3536+0.3536j \\ 0.3536+0.3536j & 0.3536-0.3536j & -0.3536-0.3536j & -0.3536+0.3536j \end{matrix}$$

$$\text{codebook}(:,:,10) = \begin{matrix} 0.5000 & 0.5000 & 0.5000 & 0.5000 \\ 0.5000 & 0+0.5000j & -0.5000 & 0-0.5000j \\ 0.4904+0.0975j & -0.4904-0.0975j & 0.4904+0.0975j & -0.4904-0.0975j \\ 0.4904+0.0975j & 0.0975-0.4904j & -0.4904-0.0975j & -0.0975+0.4904j \end{matrix}$$

-continued $$\text{codebook}(:,:,11) = \begin{matrix} 0.5000 & 0.5000 & 0.5000 & 0.5000 \\ 0.5000 & 0+0.5000j & -0.5000 & 0-0.5000j \\ 0.4904-0.0975j & -0.4904+0.0975j & 0.4904-0.0975j & -0.4904+0.0975j \\ 0.4904-0.0975j & -0.0975-0.4904j & -0.4904+0.0975j & 0.0975+0.4904j \end{matrix}$$

$$\text{codebook}(:,:,12) = \begin{matrix} 0.5000 & 0.5000 & 0.5000 & 0.5000 \\ 0.5000 & 0+0.5000j & -0.5000 & 0-0.5000j \\ 0.4904+0.0975j & -0.4904-0.0975j & 0.4904+0.0975j & -0.4904-0.0975j \\ 0.4904-0.9075j & -0.0975-0.4904j & -0.4904+0.0975j & 0.0975+0.4904j \end{matrix}$$

$$\text{codebook}(:,:,13) = \begin{matrix} 0.5000 & 0.5000 & 0.5000 & 0.5000 \\ 0.5000 & 0+0.5000j & -0.5000 & 0-0.5000j \\ 0.4904-0.0975j & -0.4904+0.0975j & 0.4904-0.0975j & -0.4904+0.0975j \\ 0.4904+0.0975j & 0.0975-0.4904j & -0.4904-0.0975j & -0.0975+0.4904j \end{matrix}$$

$$\text{codebook}(:,:,14) = \begin{matrix} 0.5000 & 0.5000 & 0.5000 & 0.5000 \\ 0.3536+0.3536j & -0.3536+0.3536j & -0.3536-0.3536j & 0.3536-0.3536j \\ 0.5000 & -0.5000 & -0.5000 & -0.5000 \\ 0.3536+0.3536j & 0.3536-0.3536j & -0.3536-0.3536j & -0.3536+0.3536j \end{matrix}$$

$$\text{codebook}(:,:,15) = \begin{matrix} 0.5000 & 0.5000 & 0.5000 & 0.5000 \\ 0.3536-0.3536j & 0.3536+0.3536j & -0.3536+0.3536j & -0.3536-0.3536j \\ 0.5000 & -0.5000 & -0.5000 & -0.5000 \\ 0.3536-0.3536j & -0.3536-0.3536j & -0.3536+0.3536j & 0.3536+0.3536j \end{matrix}$$

$$\text{codebook}(:,:,16) = \begin{matrix} 0.5000 & 0.5000 & 0.5000 & 0.5000 \\ 0.4904+0.0975j & -0.975+0.4904j & -0.4904-0.0975j & 0.0975-0.4904j \\ 0.5000 & -0.5000 & 0.5000 & -0.5000 \\ 0.4904+0.0975j & 0.0975-0.4904j & -0.4904-0.0975j & -0.0975+0.4904j \end{matrix}$$

35

Codebook Set 12:

1 basis codeword
4 DFT codewords with $\pi/8$ and $\pi/32$
8 approach 2 codewords with $\pi/4$ and $\pi/16$
3 approach 1 codewords with $\pi/4$ and $\pi/16$ $$\text{codebook}(:,:,1) = \begin{matrix} 0.5000 & 0.5000 & 0.5000 & 0.5000 \\ 0.5000 & 0+0.5000j & -0.5000 & 0-0.5000j \\ 0.5000 & -0.5000 & 0.5000 & -0.5000 \\ 0.5000 & 0-0.5000j & -0.5000 & 0+0.5000j \end{matrix}$$

$$\text{codebook}(:,:,2) = \begin{matrix} 0.5000 & 0.5000 & 0.5000 & 0.5000 \\ 0.4619+0.1913j & -0.1913+0.4619j & -0.4619-0.1913j & 0.1913-0.4619j \\ 0.3536+0.3536j & -0.3536-0.3536j & 0.3536+0.3536j & -0.3536-0.3536j \\ 0.1913+0.4619j & 0.4619-0.1913j & -0.1913-0.4619j & -0.4619+0.1913j \end{matrix}$$

$$\text{codebook}(:,:,3) = \begin{matrix} 0.5000 & 0.5000 & 0.5000 & 0.5000 \\ 0.4619-0.1913j & 0.1913+0.4619j & -0.4619+0.1913j & -0.1913-0.4619j \\ 0.3536-0.3536j & -0.3536+0.3536j & 0.3536-0.3536j & -0.3536+0.3536j \\ 0.1913-0.4619j & -0.4619-0.1913j & -0.1913+0.4619j & 0.4619+0.1913j \end{matrix}$$

$$\text{codebook}(:,:,4) = \begin{matrix} 0.5000 & 0.5000-0.0000j & 0.5000-0.0000j & 0.5000-0.0000j \\ 0.4976+0.0490j & -0.0490+0.4976j & -0.4976-0.0490j & 0.0490-0.4976j \\ 0.4904+0.0975j & -0.4904-0.0975j & 0.4904+0.0975j & -0.4904-0.0975j \\ 0.4785+0.1451j & 0.1451-0.4785j & -0.4785-0.1451j & -0.1451+0.4785j \end{matrix}$$

-continued $$\text{codebook}(:,:,5) = \begin{matrix} 0.5000 & 0.5000 - 0.0000j & 0.5000 + 0.0000j & 0.5000 - 0.0000j \\ 0.4976 - 0.0490j & 0.0490 + 0.4976j & -0.4976 + 0.0490j & -0.0490 - 0.4976j \\ 0.4904 - 0.0975j & -0.4904 + 0.0975j & 0.4904 - 0.0975j & -0.4904 + 0.0975j \\ 0.4785 - 0.1451j & -0.1451 - 0.4785j & -0.4785 + 0.1451j & 0.1451 + 0.4785j \end{matrix}$$

$$\text{codebook}(:,:,6) = \begin{matrix} 0.5000 & 0.5000 - 0.0000j & 0.5000 - 0.0000j & 0.5000 + 0.0000j \\ 0.5000 & -0.0000 + 0.5000j & -0.5000 + 0.0000j & -0.0000 - 0.5000j \\ 0.3536 + 0.3536j & -0.3536 - 0.3536j & 0.3536 + 0.3536j & -0.3536 - 0.3536j \\ 0.3536 + 0.3536j & 0.3536 - 0.3536j & -0.3536 - 0.3536j & -0.3536 + 0.3536j \end{matrix}$$

$$\text{codebook}(:,:,7) = \begin{matrix} 0.5000 & 0.5000 - 0.0000j & 0.5000 + 0.0000j & 0.5000 + 0.0000j \\ 0.5000 & -0.000 + 0.5000j & -0.5000 - 0.0000j & -0.000 - 0.5000j \\ 0.3536 - 0.3536j & -0.3536 + 0.3536j & 0.3536 - 0.3536j & -0.3536 + 0.3536j \\ 0.3536 - 0.3536j & -0.3536 - 0.3536j & -0.3536 + 0.3536j & 0.3536 + 0.3536j \end{matrix}$$

$$\text{codebook}(:,:,8) = \begin{matrix} 0.5000 & 0.5000 - 0.0000j & 0.5000 & 0.5000 + 0.0000j \\ 0.5000 & -0.0000 + 0.5000j & -0.5000 & -0.0000 - 0.5000j \\ 0.3536 + 0.3536j & -0.3536 - 0.3536j & 0.3536 + 0.3536j & -0.3536 - 0.3536j \\ 0.3536 - 0.3536j & -0.3536 - 0.3536j & -0.3536 + 0.3536j & 0.3536 + 0.3536j \end{matrix}$$

$$\text{codebook}(:,:,9) = \begin{matrix} 0.5000 & 0.5000 - 0.0000j & 0.5000 - 0.0000j & 0.5000 - 0.0000j \\ 0.5000 & -0.0000 + 0.5000j & -0.5000 - 0.0000j & 0.0000 - 0.5000j \\ 0.3536 - 0.3536j & -0.3536 + 0.3536j & 0.3536 - 0.3536j & -0.3536 + 0.3536j \\ 0.3536 + 0.3536j & 0.3536 - 0.3536j & -0.3536 - 0.3536j & -0.3536 + 0.3536j \end{matrix}$$

$$\text{codebook}(:,:,10) = \begin{matrix} 0.5000 & 0.5000 & 0.5000 & 0.5000 \\ 0.5000 & 0 + 0.5000j & -0.5000 & 0 - 0.5000j \\ 0.4904 + 0.0975j & -0.4904 - 0.0975j & 0.4904 + 0.0975j & -0.4904 - 0.0975j \\ 0.4904 + 0.0975j & 0.0975 - 0.4904j & -0.4904 - 0.0975j & -0.0975 + 0.4904j \end{matrix}$$

$$\text{codebook}(:,:,11) = \begin{matrix} 0.5000 & 0.5000 & 0.5000 & 0.5000 \\ 0.5000 & 0 + 0.5000j & -0.5000 & 0 - 0.5000j \\ 0.4904 - 0.0975j & -0.4904 + 0.0975j & 0.4904 - 0.0975j & -0.4904 + 0.0975j \\ 0.4904 - 0.0975j & -0.0975 - 0.4904j & -0.4904 + 0.0975j & 0.0975 + 0.4904j \end{matrix}$$

$$\text{codebook}(:,:,12) = \begin{matrix} 0.5000 & 0.5000 & 0.5000 & 0.5000 \\ 0.5000 & 0 + 0.5000j & -0.5000 & 0 - 0.5000j \\ 0.4904 + 0.0975j & -0.4904 - 0.0975j & 0.4904 + 0.0975j & -0.4904 - 0.0975j \\ 0.4904 - 0.0975j & -0.0975 - 0.4904j & -0.4904 + 0.0975j & 0.0975 + 0.4904j \end{matrix}$$

$$\text{codebook}(:,:,13) = \begin{matrix} 0.5000 & 0.5000 & 0.5000 & 0.5000 \\ 0.5000 & 0 + 0.5000j & -0.5000 & 0 - 0.5000j \\ 0.4904 - 0.0975j & -0.4904 + 0.0975j & 0.4904 - 0.0975j & -0.4904 + 0.0975j \\ 0.4904 + 0.0975j & 0.0975 - 0.4904j & -0.4904 - 0.0975j & -0.0975 + 0.4904j \end{matrix}$$

$$\text{codebook}(:,:,14) = \begin{matrix} 0.5000 & 0.5000 & 0.5000 & 0.5000 \\ 0.3536 + 0.3536j & -0.3536 + 0.3536j & -0.3536 - 0.3536j & 0.3536 - 0.3536j \\ 0.5000 & -0.5000 & -0.5000 & -0.5000 \\ 0.3536 + 0.3536j & 0.3536 - 03536j & -0.3536 - 0.3536j & -0.3536 + 0.3536j \end{matrix}$$

$$\text{codebook}(:,:,15) = \begin{matrix} 0.5000 & 0.5000 & 0.5000 & 0.5000 \\ 0.3536 - 0.3536j & 0.3536 + 0.3536j & -0.3536 + 0.3536j & -0.3536 + 0.3536j \\ 0.5000 & -0.5000 & 0.5000 & -0.5000 \\ 0.3536 - 0.3536j & -0.3536 - 0.3536j & -0.3536 + 0.3536j & 0.3536 + 0.3536j \end{matrix}$$

$$\text{codebook}(:,:,16) = \begin{matrix} 0.5000 & 0.5000 & 0.5000 & 0.5000 \\ 0.4904 + 0.0975j & -0.0975 + 0.4904j & -0.4904 - 0.0975j & 0.0975 - 0.4904j \\ 0.5000 & 0.5000 & 0.5000 & -0.5000 \\ 0.4904 + 0.0975j & 0.0975 - 0.4904j & -0.4904 - 0.0975j & -0.0975 + 0.4904j \end{matrix}$$

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for selecting a codeword in a wireless communication system, the method comprising:
selecting a codeword from a code book;
generating a rotation matrix using the selected codeword, the rotation matrix being rotated based on a polar cap differential code book;
generating a new differential code book using the rotation matrix and the polar cap differential code book;
selecting a codeword from the new differential code book; and
performing data transmission using the selected codeword.

2. The method of claim 1, further comprising:
repeating generation of the rotation matrix;
generating another new differential code book according to the repeated generation of the rotation matrix; and
selecting a codeword from the another new differential code book.

3. The method of claim 2, further comprising:
resetting every codeword from the polar cap differential code book when a preset condition is satisfied.

4. The method of claim 2, wherein generating the rotation matrix comprises generating the rotation matrix according to a rank.

5. The method of claim 1, wherein the new differential code book includes combination of codewords $$e^{j\frac{\pi}{2}}, e^{j\frac{\pi}{4}}, e^{j\frac{\pi}{8}}, e^{j\frac{\pi}{16}}, e^{j\frac{\pi}{32}},$$

and 1, or scaled variation thereof.

6. A method for selecting a codeword by an enhanced Node B(eNB) in a wireless communication system, the method comprising:
generating a rotation matrix using a previously selected codeword, the rotation matrix being rotated based on a polar cap differential code book;
generating a new differential code book using the rotation matrix and the polar cap differential code book;
selecting a codeword from the new differential code book; and
performing data transmission using the selected codeword.

7. An apparatus for selecting a codeword in a wireless communication system, comprising:
a controller configured to select a codeword from a code book, generate a rotation matrix using the selected codeword, update a new differential code book using the rotation matrix and a polar cap differential code book, and select a codeword from the new differential code book, the rotation matrix being rotated based on the polar cap differential code book;
a transceiver configured to perform data transmission using the selected codeword; and
a storage configured to store the new differential code book.

8. The apparatus of claim 7, wherein the controller further configured to repeat generation of the rotation matrix, generate another new differential code book according to the repeated generation of the rotation matrix, and select a codeword from the another new differential code book.

9. The apparatus of claim 8, wherein the controller further configured to reset every codeword from the polar cap differential code book when a preset condition is satisfied.

10. The apparatus of claim 8, wherein generating the rotation matrix is generated according to a rank.

11. The apparatus of claim 7, wherein the new differential code book includes combination of codewords $$e^{j\frac{\pi}{2}}, e^{j\frac{\pi}{4}}, e^{j\frac{\pi}{8}}, e^{j\frac{\pi}{16}}, e^{j\frac{\pi}{32}},$$

and 1, or scaled variation thereof.

* * * * *